(12) United States Patent
Swier et al.

(10) Patent No.: US 10,155,885 B2
(45) Date of Patent: Dec. 18, 2018

(54) ORGANOSILOXANE COMPOSITIONS AND USES THEREOF

(71) Applicant: Dow Corning Corporation, Midland, MI (US)

(72) Inventors: Steven Swier, Midland, MI (US); Yanhu Wei, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 51 days.

(21) Appl. No.: 15/323,843

(22) PCT Filed: Jul. 28, 2015

(86) PCT No.: PCT/US2015/042402
§ 371 (c)(1),
(2) Date: Jan. 4, 2017

(87) PCT Pub. No.: WO2016/022332
PCT Pub. Date: Feb. 11, 2016

(65) Prior Publication Data
US 2017/0145258 A1    May 25, 2017

Related U.S. Application Data

(60) Provisional application No. 62/033,736, filed on Aug. 6, 2014.

(51) Int. Cl.
| | | |
|---|---|---|
| *C09D 183/16* | (2006.01) | |
| *C08K 3/00* | (2018.01) | |
| *C04B 26/32* | (2006.01) | |
| *C08L 83/06* | (2006.01) | |
| *C09D 5/00* | (2006.01) | |
| *C09D 183/06* | (2006.01) | |
| *C08L 83/04* | (2006.01) | |
| *C04B 111/00* | (2006.01) | |
| *C08G 77/12* | (2006.01) | |
| *C08G 77/14* | (2006.01) | |
| *C08G 77/20* | (2006.01) | |

(52) U.S. Cl.
CPC ............ *C09D 183/16* (2013.01); *C04B 26/32* (2013.01); *C08K 3/00* (2013.01); *C08L 83/04* (2013.01); *C08L 83/06* (2013.01); *C09D 5/00* (2013.01); *C09D 183/06* (2013.01); *C04B 2111/00482* (2013.01); *C04B 2111/00844* (2013.01); *C08G 77/12* (2013.01); *C08G 77/14* (2013.01); *C08G 77/20* (2013.01); *Y02W 30/94* (2015.05)

(58) Field of Classification Search
CPC ............................... C08G 77/12; C08G 77/20
See application file for complete search history.

(56) References Cited

U.S. PATENT DOCUMENTS

| | | | |
|---|---|---|---|
| 8,729,208 B2 | 5/2014 | Ko et al. | |
| 2006/0135687 A1* | 6/2006 | Fukui | C08L 83/04 524/588 |

FOREIGN PATENT DOCUMENTS

| | | |
|---|---|---|
| KR | 10-1497139 | 2/2015 |
| WO | WO2014038727 | 3/2014 |
| WO | WO2014069610 | 5/2014 |
| WO | WO2014104597 | 7/2014 |

OTHER PUBLICATIONS

KR10-1497139 machine translation.

* cited by examiner

*Primary Examiner* — Kuo Liang Peng

(57) ABSTRACT

The present disclosure provides methods of making organosiloxane polymer compositions from hydrosilylation curable compositions comprising at least the components (a) and (b) and at least one of components (c) and (d): (a) an organosiloxane resin material comprising aliphatic unsaturation; and (b) an organosiloxane crosslinker comprising multiple silicon atom-bonded hydrogen atoms (e.g., an "SiH siloxane"); in combination with at least one of (c) at least one organosiloxane comprising at least two silicon atom-bonded hydrogen atoms; and (d) at least one organosiloxane comprising at least two silicon atom-bonded hydrocarbyl groups comprising aliphatic unsaturation (e.g., a "di-vinyl functional siloxane"). Such hydrosilylation curable compositions have, in some instances, significantly faster cure speed, relative to their condensation curable counterparts. A faster cure speed can be important for encapsulating electronic devices, such as light-emitting diode (LED) chip devices, including devices having tall structures.

15 Claims, No Drawings

ORGANOSILOXANE COMPOSITIONS AND USES THEREOF

CROSS REFERENCE TO RELATED APPLICATIONS

This application is a U.S. national stage filing under 35 U.S.C. § 371 of PCT Application No. PCT/US15/042402 filed on Jul. 28, 2015, currently pending, which claims the benefit of U.S. Provisional Patent Application No. 62/033,736 filed Aug. 6, 2014 under 35 U.S.C. § 119 (e). PCT Application No. PCT/US15/042402 and U.S. Provisional Patent Application No. 62/033,736 are hereby incorporated by reference.

BACKGROUND

Many electronic devices use an encapsulant coating to protect electronic components from environmental factors. The curable compositions for forming these protective coatings must be easy to apply and must cure relatively quickly without producing undesired by-products. The resulting cured protective coatings must be tough, durable, and long lasting. Many of the currently available curable compositions, however, do not cure quickly enough for certain applications, and in some instances produce undesired by-products upon curing. Also, many of the currently available cured coatings lack toughness and/or are not durable and/or are not long-lasting. There is therefore a continuing need to identify protective and/or functional coatings in many areas of emerging technologies.

DESCRIPTION

The present disclosure provides methods of making organosiloxane polymer compositions from hydrosilylation curable compositions. The hydrosilylation curable compositions comprise at least the components (a) and (b) and at least one of components (c) and (d): (a) an organosiloxane resin material comprising aliphatic unsaturation; and (b) an organosiloxane crosslinker comprising multiple silicon atom-bonded hydrogen atoms (e.g., an "SiH siloxane"); in combination with at least one of components (c) and (d): (c) at least one organosiloxane comprising at least two silicon atom-bonded hydrogen atoms; and (d) at least one organosiloxane comprising at least two silicon atom-bonded hydrocarbyl groups comprising aliphatic unsaturation (e.g., a "di-vinyl functional siloxane").

In some examples, therefore, the hydrosilylation curable compositions of the various embodiments of the present invention comprise component combinations selected from the group consisting of:
components (a), (b), and (d);
components (a), (b), and (c); and
components (a), (b), (c), and (d). In some embodiments the combination comprises components (a), (b), and (d). In some embodiments the combination comprises components (a), (b), and (c). In some embodiments the combination comprises components (a), (b), (c) and (d).

In some embodiments, the hydrosilylation curable compositions further comprise a platinum hydrosilylation catalyst as component (e). In some embodiments, therefore, the hydrosilylation curable compositions comprise component combinations selected from the group consisting of:
components (a), (b), (d), and (e);
components (a), (b), (c), and (e);
components (a), (b), (c), (d), and (e). In some embodiments the combination comprises components (a), (b), (d) and (e). In some embodiments the combination comprises components (a), (b), (c) and (e). In some embodiments the combination comprises components (a), (b), (c), (d) and (e)

In some embodiments, such hydrosilylation curable compositions can be prepared with the use of little to no vehicle (e.g., an organic solvent such as toluene) and can be in liquid form at, e.g., 25° C., even in the presence of little (e.g., from >0 wt. % to 5 wt. %) to no (0 wt. %) vehicle, such that they can be dispensed directly to a site where they will be subsequently cured.

The hydrosilylation curable compositions may be used in non-electronic devices, processes and applications and in electronic devices, processes and applications. When used in electronic devices and processes for manufacturing electronic devices, the cure speed of hydrosilylation curable composition can be instrumental for encapsulating electronic devices, such as integrated circuits (IC) and light-emitting diodes (LED), and curing the encapsulant with high throughput, thereby lowering the total cost of the manufacturing process and assisting in general adoption of solid state lighting. IC and LED chip devices can also contain so-called tall structures (e.g., structures that extend 50 μm to 500 μm from the IC or LED chip surface) like the chip and diode, which can be challenging to encapsulate, for example, by lamination processes. The hydrosilylation curable composition enables, in some embodiments, a tunable, fast cure speed system that can offer the level of control needed to be successful in these situations. In addition to having a fast cure speed (e.g., time to tan δ=1 is within 10 minutes at 150° C.), after cure, the hydrosilylation curable composition exhibits, among other things, any one, any two, or all of the following characteristics: low tack, high shelf stability (e.g., retain tan δ>1 at 150° C. after 6 months storage at 23° C.) resulting from a relatively high glass transition temperatures ($T_g$; Tg higher than 30° C., preferably higher than 50° C.), and high thermal stability (e.g., the cured product has a Young's modulus of about 20 MPa to about 300 MPa (e.g., 20 MPa to about 200 MPa) after thermal aging at 225° C. for 48 hours. The cured product of curing the hydrosilylation curable composition exhibits, among other things, any one, any two, or more of the following characteristics: has a Young's modulus before thermal aging and a Young's modulus after thermal aging at 225° C. for 48 hours, wherein the ratio of the Young's modulus of the cured product after thermal aging at 225° C. for 48 hours versus the Young's modulus of the cured product before thermal aging is less than 4; the cured product has an elongation at break before thermal aging at 225° C. for 48 hours of about 20% to about 200%; and/or the Commission Internationale de l'Eclairage (CIE) b* value for the cured product after aging for 72 hours at 225° C. is from 0 to about 7). Without being bound by theory, we think that these beneficial characteristics may result from the cured product having a resin siloxane phase and a linear siloxane phase with a phase separated morphology. The resin and linear siloxane phase separated morphology may be indicated by atomic force microscopy (AFM) images and two separated glass transition temperatures ($T_g$) observed from dynamic mechanical analysis (DMA) measurements.

Various embodiments of the present invention are directed to curable compositions obtained by combining component (a) a resin material comprising aliphatic unsaturation, a component (c) bis-SiH siloxane (i.e., a siloxane having two Si—H functional groups), and component (b) a crosslinker.

Other embodiments of the present invention are directed to curable compositions obtained by combining component (a) a resin material comprising aliphatic unsaturation, component (d) a di-vinyl functional siloxane (i.e., a siloxane having two —CH=CH$_2$ groups), and component (b) a crosslinker. Such compositions may be hydrosilylation curable only, alternatively hydrosilylation curable and condensation curable. In some embodiments, such curable compositions further comprise component (e) a hydrosilylation catalyst. In some embodiments, such curable compositions further comprise component (e) a hydrosilylation catalyst and component (f) a condensation catalyst. In various embodiments, the hydrosilylation curable compositions are flowable at standard temperature (20 degrees Celsius (° C.); 293.15 Kelvin (K); 68 degrees Fahrenheit (° F.)) and pressure (101.325 kilopascals (kPa); 14.696 pounds per square inch (psi); 1 atmosphere (atm)). As used herein, the term "flowable" means that the hydrosilylation curable compositions exhibit a viscosity of less than about 300,000 centipoise (cP) at standard temperature and pressure and less than 60,000 cP at 40° C.

In some embodiments, the curable compositions obtained by combining components (a)-(d), as described herein, are flowable for days (e.g., 15 days), weeks, months, or more, after they are prepared. In some examples, the curable compositions, exhibit an isothermal rheology at 150° C. showing that the composition is flowable after 15 days and a G'$_{min}$ at 150° C. of about 500 Pa.

The curable compositions of the various embodiments of the present invention are therefore amenable to B-staging and the formation of a B-stage film.

(a) Resin Material

The component (a) organosiloxane resin materials used to prepare the curable compositions of the various embodiments of the present invention are resin materials having the unit formula: $[R^1R^2R^3SiO_{1/2}]_a[R^1R^2R^4SiO_{1/2}]_b[R^1R^5SiO_{2/2}]_c[R^1SiO_{3/2}]_d$ wherein $R^1$, $R^2$, and $R^3$ are independently a $C_1$ to $C_{30}$ hydrocarbyl group free of aliphatic unsaturation, and $R^4$ and $R^5$ are independently a $C_1$ to $C_{30}$ hydrocarbyl group free of aliphatic unsaturation or a $C_2$ to $C_{30}$ hydrocarbyl group comprising aliphatic unsaturation. Subscripts a, b, c and d are defined as follows: 0≤a<0.1, 0<b<0.2, 0≤c<0.2, d=(1−a−b−c).

As used herein, the term "$C_1$ to $C_{30}$ hydrocarbyl group free of aliphatic unsaturation" refers to a functional group derived from a straight chain, branched, or cyclic hydrocarbon comprising from 1 to 30 carbon atoms, and can be alkyl, cycloalkyl, aryl or any combination thereof.

The term "alkyl" as used herein refers to straight chain and branched alkyl groups and cycloalkyl groups having from 1 to 30 carbon atoms, 10 to 30 carbon atoms, 12 to 18 carbon atoms, 1 to about 20 carbon atoms, 1 to 10 carbons, 1 to 8 carbon atoms 1 to 5 carbon atoms or, in some embodiments, from 1 to 3 carbon atoms. Examples of straight chain alkyl groups include those with from 1 to 8 carbon atoms such as methyl, ethyl, n-propyl, n-butyl, n-pentyl, n-hexyl, n-heptyl, n-octyl groups. Examples of straight chain alkyl groups include those with from 10 to 30 carbon atoms such as n-decyl, n-undecyl, n-dodecyl, n-hexadecyl, n-icosyl, and the like. Examples of branched alkyl groups include, but are not limited to, isopropyl, iso-butyl, sec-butyl, t-butyl, neopentyl, isopentyl, 2,2-dimethylpropyl, and isostearyl groups. Examples of cycloalkyl groups include cyclobutyl, cyclopentyl, and cyclohexyl groups. As used herein, the term "alkyl" encompasses n-alkyl groups, as well as branched chain forms of alkyl. Alkyl groups can be substituted one or more times with, for example, amine (e.g., primary and secondary amine and dialkylamino), hydroxy, cyano, carboxy, nitro, sulfur containing groups (e.g., thiol, sulfide, disulfide), alkoxy (e.g., $C_1$-$C_{30}$ alkoxy), and halogen groups.

The term "aryl" as used herein refers to a group that is derived by removing a hydrogen atom from an arene, which is a cyclic aromatic hydrocarbon. Thus aryl groups include, but are not limited to, phenyl, azulenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 30 carbons in the ring portions of the groups (e.g., 6 to 30, 6 to 26, 6 to 20, 6 to 14, 6 to 10 carbons, 12 carbons, 10 carbons or 6 carbons). Preferred examples of aryl groups are phenyl, naphthyl, or biphenyl; alternatively biphenyl; alternatively naphthyl; alternatively phenyl. Aryl groups can be unsubstituted or substituted, as defined herein. Representative substituted aryl groups can be mono-substituted or substituted more than once, such as, but not limited to, di-, tri-, and tetra-substituted groups. Aryl groups can be substituted one or more times with, for example, amine (e.g., primary and secondary amine and dialkylamino), hydroxy, cyano, carboxy, nitro, sulfur containing groups (e.g., thiol, sulfide, disulfide), alkoxy (e.g., $C_1$-$C_{30}$ alkoxy), and halogen groups.

As used herein, the term "$C_2$ to $C_{30}$ hydrocarbyl group comprising aliphatic unsaturation" refers to a functional group derived from a straight chain or branched hydrocarbon comprising 2 to 30 carbon atoms and at least one carbon-carbon double or triple bond and can be alkenyl, alkynyl, cyclic aliphatic containing at least one carbon-carbon double or triple bond, or any combination thereof.

The term "alkenyl" as used herein refers to straight and branched chain hydrocarbyl groups that contain at least one carbon-carbon double bond. Thus, alkenyl groups have from 2 to 30 carbon atoms, or 2 to about 20 carbon atoms, or 2 to 12 carbons or, in some embodiments, from 2 to 8 carbon atoms. Examples include, but are not limited to vinyl (—CH=CH$_2$), —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, —CH$_2$CH$_2$CH=CH$_2$, cyclohexenyl, cyclopentenyl, cyclohexadienyl, butadienyl, pentadienyl, and hexadienyl among others.

The term "alkynyl" as used herein refers to straight and branched chain hydrocarbyl groups that contain at least one carbon-carbon triple bond. Thus, alkynyl groups have from 2 to 30 carbon atoms, 2 to about 20 carbon atoms, 2 to 12 carbons or, in some embodiments, from 2 to 8 carbon atoms. Examples include, but are not limited to —C≡CH, —C≡CCH$_3$, —C≡CCH$_2$CH$_3$, —CH$_2$C≡CH, —CH$_2$C≡CCH$_3$, and —CH$_2$C≡CCH$_2$CH$_3$ among others.

In the component (a) the subscripts a, b, c, and d represent the mole fractions of the siloxy units $[R^1R^2R^3SiO_{1/2}]$, $[R^1R^2R^4SiO_{1/2}]$, $[R^1R^5SiO_{2/2}]$, and $[R^1SiO_{3/2}]$, respectively. The subscript a may be as follows: 0≤a<0.1. The subscript b may be as follows: 0<b<0.2, e.g., 0.05<b<0.15 and 0.08<b<0.15. The subscript c may be as follows: 0≤c<0.2 (e.g., 0≤c<0.1). And the subscript d may be as follows: d=(1−a−b−c). In some embodiments, the subscript d may range from 0.6 to 1, e.g., from 0.6 to 0.9, 0.6 to 0.8, 0.7 to 1 or 0.8 to 1.

In some embodiments, component (a) the resin material has a weight average molecular weight ($M_w$) of from about 1500 grams per mole (g/mole) to about 6000 g/mole, e.g., from about 2000 g/mole to about 6000 g/mole, about 1500 g/mole to about 5000 g/mole, about 2000 g/mole to about 4000 g/mole, about 2400 g/mole to about 3600 g/mole or about 2500 g/mole to about 3700 g/mole.

In some embodiments, component (a) the resin material has a mole ratio of silicon bonded hydroxy (SiOH) to resin material of about 0.05 to about 0.5, e.g., from about 0.05 to about 0.1, about 0.1 to about 0.5, about 0.05 to about 0.3, about 0.1 to about 0.3 or about 0.1 to about 0.4. In other embodiments the resin material may have a mole ratio of silicon bonded hydroxy (SiOH) to resin material of 0; that is the resin material may lack or be free of SiOH groups or may have such a low mole ratio of SiOH to resin material that the resin material is not condensation curable.

In some embodiments, component (a) the resin material has a silicon bonded hydroxy (SiOH) mole % of from about 1 mole % to about 70 mole %, e.g., from about 10 mole % to about 70 mole %, about 10 mole % to about 40 mole %, about 15 mole % to about 30 mole %, about 20 mole % to about 40 mole %, about 20 mole % to about 50 mole % or about 30 mole % to about 50 mole %.

In some embodiments, component (a) the resin material has from about 4 mole % to about 20 mole % $C_2$ to $C_{30}$ hydrocarbyl groups comprising aliphatic unsaturation, e.g., from about 4 mole % to about 15 mole % $C_2$ to $C_{30}$ hydrocarbyl groups comprising aliphatic unsaturation, about 6 mole % to about 14 mole % $C_2$ to $C_{30}$ hydrocarbyl groups comprising aliphatic unsaturation, about 10 mole % to about 15 mole % $C_2$ to $C_{30}$ hydrocarbyl groups comprising aliphatic unsaturation or about 8 mole % to about 12 mole % $C_2$ to $C_{30}$ hydrocarbyl groups comprising aliphatic unsaturation.

In some embodiments, component (a) the resin material has from about 4 mole % to about 20 mole % vinyl groups, e.g., from about 4 mole % to about 15 mole % vinyl groups, about 6 mole % to about 14 mole % vinyl groups, about 10 mole % to about 15 mole % vinyl groups or about 8 mole % to about 12 mole % vinyl groups.

(b) Crosslinker

The hydrosilylation curable compositions of the various embodiments of the present invention comprise component (b) a crosslinker having the unit formula:

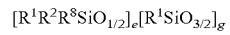

(the initial crosslinker unit formula) wherein $R^1$ and $R^2$ are independently a $C_1$ to $C_{30}$ hydrocarbyl free of aliphatic unsaturation, $R^8$ and $R^9$ are independently a H, a $C_1$ to $C_{30}$ hydrocarbyl free of aliphatic unsaturation or a silane radical of the formula —$[R^{10}R^{11}Si]_p[R^{10}R^{11}SiH]$ (wherein $R^{10}$, $R^{11}$ is independently a H or a $C_1$ to $C_{30}$ hydrocarbyl free of aliphatic unsaturation, and subscript p is an integer from 0 to 10), subscript e is an integer from 0 to 100 (e.g., from 2 to 100, 40 to 50, 40 to 60, 50 to 70, 40 to 80, 40 to 70, 1 to 80, 1 to 10, 0 to 10, 1 to 6 or 10 to 70), subscript f is an integer from 0 to 50 (e.g., from 1 to 50, 1 to 30, 1 to 8, 1 to 6 or 1 to 4), subscript g is an integer from 0 to 60 (e.g., from 30 to 50, 0 to 15, 0 to 40, 10 to 40, 20 to 40, 0 to 10, 0 to 5 or 1 to 5), and the number of SiH groups in the crosslinker is ≥2 per crosslinker molecule (e.g., ≥4, ≥6, ≥8, ≥10; or from 2 to 10 per crosslinker molecule).

Non-limiting examples of component (b) a crosslinker include crosslinkers having the initial crosslinker unit formula wherein the subscript f is 0, and thus being of the following unit formula:

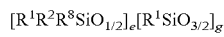

wherein $R^1$ and $R^2$ is independently a $C_1$ to $C_{30}$ hydrocarbyl free of aliphatic unsaturation, $R^8$ is independently a H, a $C_1$ to $C_{30}$ hydrocarbyl free of aliphatic unsaturation or a silane radical of the formula —$[R^{10}R^{11}Si]_p[R^{10}R^{11}SiH]$ (wherein $R^{10}$, $R^{11}$ is independently a H or a $C_1$ to $C_{30}$ hydrocarbyl free of aliphatic unsaturation, subscript p is an integer from 0 to 10), subscript e is an integer from 2 to 100 (e.g., from 40 to 50, 40 to 60, 50 to 70, 40 to 80, 40 to 70, 2 to 80, 2 to 10, 2 to 6 or 10 to 70), subscript g is an integer from 0 to 60 (e.g., from 30 to 50, 0 to 15, 0 to 40, 10 to 40, 20 to 40, 0 to 10, 0 to 5 or 1 to 5), and the number of SiH groups in the crosslinker is ≥2 per crosslinker molecule (e.g., ≥4, ≥6, ≥8, ≥10; or from 2 to 10 per crosslinker molecule).

Other non-limiting examples of component (b) a crosslinker include crosslinkers having the initial crosslinker unit formula wherein the subscript f is 0, and thus being of the following unit formula:

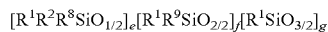

wherein $R^1$ and $R^2$ is independently $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl), $R^8$ is independently a H or a $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl), subscript e is an integer from 2 to 100 (e.g., from 40 to 50, 40 to 60, 50 to 70, 40 to 80, 40 to 70, 2 to 80, 2 to 10, 2 to 6 or 10 to 70), subscript g is an integer from 0 to 60 (e.g., from 30 to 50, 0 to 15, 0 to 40, 10 to 40, 20 to 40, 0 to 10, 0 to 5 or 1 to 5), and at least two $R^8$ are H, such that the number of SiH groups in the crosslinker is ≥2 per crosslinker molecule (e.g., ≥4, ≥6, ≥8, ≥10; or from 2 to 10 per crosslinker molecule).

Still other non-limiting examples of component (b) a crosslinker include crosslinkers having the initial crosslinker unit formula wherein the subscript f is 0, and thus being of the following unit formula:

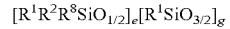

wherein $R^1$ and $R^2$ is independently $C_1$ to $C_3$ alkyl or $C_6$ to $C_{10}$ aryl, $R^8$ is independently a H, $C_1$ to $C_3$ alkyl or $C_6$ to $C_{10}$ aryl, subscript e is an integer from 2 to 100 (e.g., from 40 to 50, 40 to 60, 50 to 70, 40 to 80, 40 to 70, 2 to 80, 2 to 10, 2 to 6 or 10 to 70), subscript g is an integer from 0 to 60 (e.g., from 30 to 50, 0 to 15, 0 to 40, 10 to 40, 20 to 40, 0 to 10, 0 to 5 or 1 to 5), and at least two $R^8$ are H, such that the number of SiH groups in the crosslinker is ≥2 per crosslinker molecule (e.g., ≥4, ≥6, ≥8, ≥10; or from 2 to 10 per crosslinker molecule).

Yet other non-limiting examples of component (b) a crosslinker include crosslinkers having the initial crosslinker unit formula wherein the subscript f is 0, and thus being of the following unit formula:

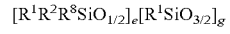

wherein $R^1$ is methyl or phenyl; $R^2$ is methyl or phenyl; $R^8$ is H, e is an integer from 2 to 100 (e.g., from 40 to 50, 40 to 60, 50 to 70, 40 to 80, 40 to 70, 2 to 80, 2 to 10, 2 to 6 or 10 to 70), g is an integer from 0 to 60 (e.g., from 30 to 50, 0 to 15, 0 to 40, 10 to 40, 20 to 40, 0 to 10, 0 to 5 or 1 to 5), such that the number of SiH groups in the crosslinker is ≥2 per crosslinker molecule (e.g., ≥4, ≥6, ≥8, ≥10; or from 2 to 10 per crosslinker molecule). Or, in some embodiments, $R^1$ is methyl or phenyl; $R^2$ is methyl or phenyl; $R^8$ is H, subscript e is an integer from 40 to 80 (e.g., from 40 to 50, 40 to 60 or 50 to 70), subscript g is an integer from 30 to 60, such that the number of SiH groups in the crosslinker is ≥2 per crosslinker molecule (e.g., ≥4, ≥6, ≥8, ≥10; or from 2 to 10 per crosslinker molecule).

Non-limiting examples of component (b) a crosslinker include crosslinkers having the initial crosslinker unit formula wherein the subscript g is 0, and thus being of the following unit formula:

$$[R^1R^2R^8SiO_{1/2}]_e[R^1R^9SiO_{2/2}]_f$$

wherein $R^1$ and $R^2$ are independently a $C_1$ to $C_{30}$ hydrocarbyl free of aliphatic unsaturation, $R^8$ and $R^9$ are independently a H, a $C_1$ to $C_{30}$ hydrocarbyl free of aliphatic unsaturation or a silane radical of the formula —$[R^{10}R^{11}Si]_p[R^{10}R^{11}SiH]$ (wherein $R^{10}$, $R^{11}$ is independently a H or a $C_1$ to $C_{30}$ hydrocarbyl free of aliphatic unsaturation, p is an integer from 0 to 10), e is an integer from 0 to 10 (e.g., from 0 to 9, 1 to 9, 2 to 8, 2 to 6 or 2 to 4), f is an integer from 0 to 10 (e.g., from 0 to 9, from 0 to 7, from 0 to 5, from 1 to 8, 1 to 6 or 1 to 4), and the number of SiH groups in the crosslinker is ≥2 per crosslinker molecule (e.g., ≥4, ≥6, ≥8, ≥10; or from 2 to 10 per crosslinker molecule).

Other non-limiting examples of component (b) a crosslinker include crosslinkers having the initial crosslinker unit formula wherein the subscript g is 0, and thus being of the following unit formula:

$$[R^1R^2R^8SiO_{1/2}]_e[R^1R^9SiO_{2/2}]_f$$

wherein $R^1$, $R^2$, and $R^9$ is independently $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl), $R^8$ is independently a H or a $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl), subscript e is an integer from 2 to 10 (e.g., from 2 to 8, 2 to 6 or 2 to 4), subscript f is an integer from 0 to 10 (e.g., from 1 to 8, 1 to 6 or 1 to 4), and at least two $R^8$ are H such that the number of SiH groups in the crosslinker is ≥2 per crosslinker molecule (e.g., ≥4, ≥6, ≥8, ≥10; or from 2 to 10 per crosslinker molecule).

Still other non-limiting examples of component (b) a crosslinker include crosslinkers having the initial crosslinker unit formula wherein the subscript g is 0, and thus being of the following unit formula:

$$[R^1R^2R^8SiO_{1/2}]_e[R^1R^9SiO_{2/2}]_f$$

wherein $R^1$, $R^2$, and $R^9$ is independently $C_1$ to $C_3$ alkyl or $C_6$ to $C_{10}$ aryl, $R^8$ is independently a H, $C_1$ to $C_3$ alkyl or $C_6$ to $C_{10}$ aryl, subscript e is an integer from 2 to 10 (e.g., from 2 to 8, 2 to 6 or 2 to 4), subscript f is an integer from 0 to 10 (e.g., from 0 to 9, from 0 to 7, from 0 to 5, from 1 to 8, 1 to 6 or 1 to 4), and at least two $R^8$ are H such that the number of SiH groups in the crosslinker is ≥2 per crosslinker molecule (e.g., ≥4, ≥6, ≥8, ≥10; or from 2 to 10 per crosslinker molecule).

Yet other non-limiting examples of component (b) a crosslinker include crosslinkers having the initial crosslinker unit formula wherein the subscript g is 0, and thus being of the following unit formula:

$$[R^1R^2R^8SiO_{1/2}]_e[R^1R^9SiO_{2/2}]_f$$

wherein $R^1$ is methyl or phenyl; $R^2$ is methyl or phenyl; $R^9$ is $R^2$ is methyl or phenyl; $R^8$ is H, subscript e is an integer from 2 to 10 (e.g., from 2 to 8, 2 to 6 or 2 to 4), and subscript f is an integer from 1 to 10 (e.g., from 1 to 8, 1 to 6 or 1 to 4). Or, in some embodiments, $R^1$ is methyl or phenyl; $R^2$ is methyl or phenyl; $R^9$ is $R^2$ is methyl or phenyl; $R^8$ is H, e is an integer from 2 to 10 (e.g., from 2 to 8, 2 to 6 or 2 to 4), and f is an integer from 0 to 10 (e.g., from 0 to 9, from 0 to 7, from 0 to 5, from 1 to 8, 1 to 6 or 1 to 4).

In some embodiments, a combination of two different crosslinkers (b), one being of the formula $[R^1R^2R^8SiO_{1/2}]_e[R^1R^9SiO_{2/2}]_f$ and another being of the formula $[R^1R^2R^8SiO_{1/2}]_e[R^1SiO_{3/2}]_g$ (e.g., $M^H_2D^{Ph}_2$ and $M^H60T^{Ph}_{40}$, respectively), is used in the hydrosilylation curable compositions of the various embodiments of the present invention. When the combination of two different crosslinkers (b) of the formulas $[R^1R^2R^8SiO_{1/2}]_e[R^1R^9SiO_{2/2}]_f$ and $[R^1R^2R^8SiO_{1/2}]_e[R^1SiO_{3/2}]_g$ is used, the crosslinkers can be used in any suitable amount and in any suitable ratio, with the proviso that the total amount of the crosslinkers is as described herein for component (b). In some examples, a suitable w/w ratio of the two different crosslinkers (b) of the formulas $[R^1R^2R^8SiO_{1/2}]_e[R^1R^9SiO_{2/2}]_f$ and $[R^1R^2R^8SiO_{1/2}]_e[R^1SiO_{3/2}]_g$ is from about 8:1 to about 1:8 (e.g., from about 6:1 to about 1:1, about 5:1 to about 1:1; about 5:1 to about 2:1; or about 5:1 to about 3:1 w/w).

(c) SiH Siloxane

The hydrosilylation curable compositions of the various embodiments of the present invention can comprise any suitable component (c) a SiH siloxane. The SiH siloxane can be a siloxane having the formula:

$$[R^1R^2R^6SiO_{1/2}][R^1R^2SiO_{2/2}]_m[O_{1/2}SiR^6R^2R^1],$$

wherein $R^1$ and $R^2$ is independently a $C_1$ to $C_{30}$ hydrocarbyl free of aliphatic unsaturation, $R^6$ independently is H or a silane radical of the formula —$[R^1R^2Si]_p[R^1R^2SiH]$, wherein subscript p is an integer from 0 to 10 (e.g., from 0 to 8, from 0 to 6, from 0 to 4, from 1 to 7, from 1 to 5, from 1 to 3 or from 1 to 2) or $R^6$ is H, and subscript m is an integer from 20 to 200 (e.g., from 20 to 175, from 40 to 100, from 50 to 90, from 20 to 100, from 20 to 150, from 80 to 150, from 100 to 150, from 50 to 150 or from 80 to 200).

The $R^1$ and $R^2$ groups in the various components (a)-(d) described herein can be the same or different from component to component, e.g., from component (a) to component (b), (c) and/or (d). Thus, for example, $R^1$ in the component (a) organosiloxane resin materials described herein can be aryl, while the $R^1$ in the SiH siloxane (c), the crosslinker (b) or the example of component (d) di-vinyl functional siloxane can be alkyl.

Non-limiting examples of suitable component (c) SiH siloxanes include compounds of the general formula:

$$[R^1R^2HSiO_{1/2}][R^1R^2SiO_{2/2}]_m[O_{1/2}SiHR^2R^1]$$

wherein $R^1$ is $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl); $R^2$ is $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl); and subscript m is as defined herein.

Other non-limiting examples of suitable component (c) SiH siloxanes include compounds of the general formula:

$$[R^1R^2HSiO_{1/2}][R^1R^2SiO_{2/2}]_m[O_{1/2}SiHR^2R^1]$$

wherein $R^1$ is $C_1$ to $C_3$ alkyl or $C_6$ to $C_{10}$ aryl; $R^2$ is $C_1$ to $C_3$ alkyl or $C_6$ to $C_{10}$ aryl; and subscript m is as defined herein.

Still other non-limiting examples of suitable component (c) SiH siloxanes include compounds of the general formula:

$$[R^1R^2HSiO_{1/2}][R^1R^2SiO_{2/2}]_m[O_{1/2}SiHR^2R^1]$$

wherein subscript m is as defined herein; $R^1$ is methyl or phenyl; and $R^2$ is methyl or phenyl, for example, compounds where $R^1$ and $R^2$ are methyl; $R^1$ and $R^2$ are phenyl; $R^1$ is methyl and $R^2$ is phenyl; and $R^1$ is phenyl and $R^2$ is methyl.

(d) Organosiloxane Comprising at Least Two Silicon Atom-bonded Hydrocarbyl Groups Comprising Aliphatic Unsaturation The hydrosilylation curable compositions of the various embodiments of the present invention can comprise any suitable component (d) organosiloxane comprising at least two silicon atom-bonded hydrocarbyl groups comprising aliphatic unsaturation. The component (d) organosiloxane comprising at least two silicon atom-bonded hydrocarbyl groups comprising aliphatic unsaturation can be a siloxane having the formula:

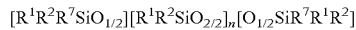

wherein $R^1$ and $R^2$ is independently a $C_1$ to $C_{30}$ hydrocarbyl free of aliphatic unsaturation, $R^7$ is a $C_2$ to $C_{30}$ hydrocarbyl comprising aliphatic unsaturation, and subscript n is an integer from 20 to 200 (e.g., from 20 to 175, from 40 to 100, from 50 to 90, from 20 to 100, from 20 to 150, from 80 to 150, from 100 to 150, from 50 to 150 or from 80 to 200).

Non-limiting examples of component (d) organosiloxanes comprising at least two silicon atom-bonded hydrocarbyl groups comprising aliphatic unsaturation include compounds of the general formula:

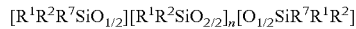

wherein $R^1$ is $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl); $R^2$ is $C_1$ to $C_{10}$ alkyl (e.g., $C_1$ to $C_8$ alkyl, $C_1$ to $C_5$ alkyl or $C_1$ to $C_3$ alkyl) or $C_6$ to $C_{14}$ aryl (e.g., $C_6$ to $C_{10}$ aryl); $R^7$ is independently a $C_2$ to $C_{12}$ alkenyl group or a $C_2$ to $C_8$ alkenyl group; and subscript n is as defined herein.

Other non-limiting examples of component (d) organosiloxanes comprising at least two silicon atom-bonded hydrocarbyl groups comprising aliphatic unsaturation include compounds of the general formula:

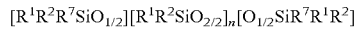

wherein $R^1$ is $C_1$ to $C_3$ alkyl or $C_6$ to $C_{10}$ aryl; $R^2$ is $C_1$ to $C_3$ alkyl or $C_6$ to $C_{10}$ aryl; $R^7$ is independently a $C_2$ to $C_8$ alkenyl group; and subscript n is as defined herein.

Still other non-limiting examples of component (d) organosiloxanes comprising at least two silicon atom-bonded hydrocarbyl groups comprising aliphatic unsaturation include compounds of the general formula:

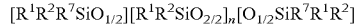

wherein $R^1$ is $C_1$ to $C_3$ alkyl or $C_6$ to $C_{10}$ aryl; $R^2$ is $C_1$ to $C_3$ alkyl or $C_6$ to $C_{10}$ aryl; $R^7$ is a vinyl (—CH=CH$_2$) group; and subscript n is as defined herein.

Yet other non-limiting examples of component (d) organosiloxanes comprising at least two silicon atom-bonded hydrocarbyl groups comprising aliphatic unsaturation include compounds of the general formula:

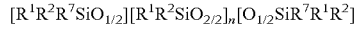

wherein subscript n is as defined herein; $R^1$ is methyl or phenyl; $R^2$ is methyl or phenyl; and $R^7$ is a vinyl (—CH=CH$_2$) group, for example, compounds where $R^1$ and $R^2$ are methyl; $R^1$ and $R^2$ are phenyl; $R^1$ is methyl and $R^2$ is phenyl; and $R^1$ is phenyl and $R^2$ is methyl.

(e) Hydrosilylation Catalyst

The hydrosilylation curable compositions of the various embodiments of the present invention can further comprise component (e) a hydrosilylation catalyst. In other embodiments the hydrosilylation curable compositions of the other embodiments of the present invention are free of (i.e., lack) component (e) a hydrosilylation catalyst. Other embodiments of the hydrosilylation curable compositions that lack component (e) may be useful for storing and/or transporting the hydrosilylation curable compositions, which later may be converted to the various embodiments that further comprise component (e) by contacting (e.g., mixing) the other embodiments of the hydrosilylation curable compositions that lack component (e) with the component (e) a hydrosilylation catalyst so as to yield the various embodiments of the hydrosilylation curable compositions that further comprise component (e). The contacting may be done shortly before curing said various embodiments of the hydrosilylation curable compositions that further comprise component (e). The hydrosilylation catalyst may be any suitable hydrosilylation catalyst, including metal based catalyst selected from a platinum, rhodium, iridium, palladium, ruthenium or iron. Metal containing catalysts useful to catalyze the hydrosilylation reaction can be any catalyst known to catalyze reactions of silicon bonded hydrogen atoms with silicon bonded moieties comprising unsaturated hydrocarbon groups. In some embodiments, the metal for use as a catalyst to effect the hydrosilylation is a platinum based catalyst such as platinum metal, platinum compounds and platinum complexes.

Suitable platinum catalysts for component (e) include, but are not limited to, the catalyst described in U.S. Pat. No. 2,823,218 (e.g., "Speier's catalyst") and U.S. Pat. No. 3,923,705, the entireties of both of which are incorporated by reference as if fully set forth herein. Other suitable platinum catalysts include, but are not limited to, the platinum catalyst referred to as "Karstedt's catalysts," which are described in U.S. Pat. Nos. 3,715,334 and 3,814,730. Karstedt's catalyst is a platinum divinyl tetramethyl disiloxane complex, in some cases, containing about one-weight percent of platinum in a solvent such as toluene. Alternatively platinum catalysts include, but are not limited to, the reaction product of chloroplatinic acid and an organosilicon compound containing terminal aliphatic unsaturation, including the catalysts described in U.S. Pat. No. 3,419,593, the entirety of which is incorporated by reference as if fully set forth herein. Alternatively, hydrosilylation catalysts include, but are not limited to, neutralized complexes of platinum chloride and divinyl tetramethyl disiloxane, as described in U.S. Pat. No. 5,175,325. Further suitable hydrosilylation catalysts are described in, for example, U.S. Pat. Nos. 3,159,601; 3,220,972; 3,296,291; 3,516,946; 3,989,668; 4,784,879; 5,036,117; and 5,175,325 and EP 0 347 895 B1.

The component (e) hydrosilylation catalyst may be added in an amount equivalent to as little as 0.001 parts by weight of elemental platinum group metal, per one million parts (ppm) of the total hydrosilylation curable composition. In some embodiments, the concentration of the hydrosilylation catalyst in the hydrosilylation curable composition is the concentration capable of providing the equivalent of at least 1 part per million of elemental platinum group metal. A catalyst concentration providing the equivalent of 1 to 500, alternatively 50 to 500, alternatively 50 to 200 parts per million of elemental platinum group metal may be used.

(f) Condensation Catalyst

The hydrosilylation curable compositions of the various embodiments of the present invention can further comprise component (f) a condensation catalyst. In other embodiments the hydrosilylation curable compositions of the various embodiments of the present invention are free of (i.e., lack) component (f) a condensation catalyst. Other embodiments of the hydrosilylation curable compositions that lack component (f) may be useful for storing and/or transporting the hydrosilylation curable compositions, which later may be converted to the various embodiments that further comprise component (f) by contacting (e.g., mixing) the other embodiments of the hydrosilylation curable compositions that lack component (f) with the component (f) a condensation catalyst so as to yield the various embodiments of the hydrosilylation curable compositions that further comprise component (f), which various embodiments may be called hydrosilylation curable and condensation curable. The contacting may be done shortly before curing said various embodiments of the hydrosilylation curable compositions that further comprise component (f). The condensation catalyst may be selected from any catalyst known in the art to effect condensation cure of organosiloxanes, such as various base, tin or titanium catalysts. Condensation catalyst for component (f) can be any condensation catalyst that may be used to promote condensation of silicon bonded hydroxy groups to form Si—O—Si linkages. Examples include, but are not limited to, amines and complexes of lead, tin, titanium, zinc, and iron. Other examples include, but are not limited to basic compounds, such as trimethylbenzylammonium hydroxide, tetramethylammonium hydroxide, n-hexylamine, tributylamine, diazabicycloundecene (DBU) and dicyandiamide; and metal-containing compounds such as tetraisopropyl titanate, tetrabutyl titanate, titanium acetylacetonate, aluminum triisobutoxide, aluminum triisopropoxide, zirconium tetra(acetylacetonato), zirconium tetrabutylate, cobalt octylate, cobalt acetylacetonato, iron acetylacetonato, tin acetylacetonato, dibutyltin octylate, dibutyltin laurate, zinc octylate, zinc benzoate, zinc p-tert-butylbenzoate, zinc laurate, zinc stearate, aluminum phosphate, and aluminum triisopropoxide; organic titanium chelates such as trisacetylacetonate, aluminum bisethylacetoacetate monoacetylacetonate, diisopropoxybis(ethylacetoacetate)titanium, and diisopropoxybis(ethylacetoacetate)titanium. In some embodiments the component (f) condensation catalyst is present in the hydrosilylation curable composition and is DBU.

In some embodiments, component (f) the condensation catalysts include zinc octylate, zinc benzoate, zinc p-tert-butylbenzoate, zinc laurate, zinc stearate, aluminum phosphate, and aluminum triisopropoxide. See, e.g., U.S. Pat. No. 8,193,269, the entire disclosure of which is incorporated by reference as if fully set forth herein. Other examples of condensation catalysts include, but are not limited to aluminum alkoxides, antimony alkoxides, barium alkoxides, boron alkoxides, calcium alkoxides, cerium alkoxides, erbium alkoxides, gallium alkoxides, silicon alkoxides, germanium alkoxides, hafnium alkoxides, indium alkoxides, iron alkoxides, lanthanum alkoxides, magnesium alkoxides, neodymium alkoxides, samarium alkoxides, strontium alkoxides, tantalum alkoxides, titanium alkoxides, tin alkoxides, vanadium alkoxide oxides, yttrium alkoxides, zinc alkoxides, zirconium alkoxides, titanium or zirconium compounds, especially titanium and zirconium alkoxides, and chelates and oligo- and polycondensates of the above alkoxides, dialkyltin diacetate, tin(II) octoate, dialkyltin diacylate, dialkyltin oxide and double metal alkoxides. Double metal alkoxides are alkoxides containing two different metals in a particular ratio. In some embodiments, the condensation catalysts include titanium tetraethylate, titanium tetrapropylate, titanium tetraisopropylate, titanium tetrabutylate, titanium tetraisooctylate, titanium isopropylate tristearoylate, titanium truisopropylate stearoylate, titanium diisopropylate distearoylate, zirconium tetrapropylate, zirconium tetraisopropylate, zirconium tetrabutylate. See, e.g., U.S. Pat. No. 7,005,460, the entire disclosure of which is incorporated by reference as if fully set forth herein. In addition, the condensation catalysts include titanates, zirconates and hafnates as described in DE 4427528 C2 and EP 0 639 622 B1, both of which are incorporated by reference as if fully set forth herein.

Cured Compositions: Physical Properties

The hydrosilylation curable compositions of the various embodiments of the present invention can be cured in the presence of a hydrosilylation catalyst and, in some instances, in the presence of a hydrosilylation catalyst and a condensation catalyst. The hydrosilylation curable compositions of the various embodiments of the present invention can be cured using hydrosilylation conditions known in the art in the presence of a hydrosilylation catalyst to give solid cured compositions. The hydrosilylation curable compositions of the various embodiments of the present invention can cure via other curing mechanisms, in addition to a hydrosilylation cure mechanism, e.g., via condensation cure mechanisms in the presence or absence of a condensation cure catalyst. Said embodiments of the hydrosilylation curable compositions that cure by hydrosilylation curing and via at least one other curing mechanism such as via condensation curing may be called herein "dual cure" compositions. Dual cure compositions may be particularly useful for use in B-staging to make B-stage films, as described above.

In some embodiments, the hydrosilylation curable compositions of the various embodiments of the present invention have, upon curing thereof, a cure speed in pascals per minute (Pa/min) of from about 0.5 to about 10 Pa/min (e.g., about 0.5 to about 5, about 1 to about 10, about 2 to about 8 or about 1 to about 6 Pa/min) as determined by rheology measurements (the cure speed was derived from the isothermal rheology curve measured at 150° C. for each ~1 mm thick sample). The cure speed may be their hydrosilylation cure speed.

In some embodiments, the cured product of curing the hydrosilylation curable compositions of the various embodiments of the present invention has a Young's modulus (1 mm thick sample films were cut to dog-bone shaped specimens, followed by tensile measurement using an Instron Bluehill instrument) after cure of about 20 megapascals (MPa) to about 500 MPa., e.g., from about 20 MPa to about 200 MPa, from about 20 MPa to about 150 MPa, about 40 MPa to about 150 MPa, about 50 MPa to about 120 MPa, about 40 MPa to about 100 MPa, about 80 MPa to about 120 MPa or about 50 MPa to about 150 MPa.

In some embodiments, the cured product of curing the hydrosilylation curable compositions of the various embodiments of the present invention has a Young's modulus after cure and after thermal aging at 225° C. for 48 hours of about 20 MPa to about 200 MPa., e.g., from about 50 MPa to about 500 MPa, about 50 MPa to about 400 MPa, about 50 MPa to about 350 MPa, about 100 MPa to about 350 MPa, about 150 MPa to about 300 MPa or about 100 MPa to about 250 MPa.

In some embodiments, the cured product of curing the hydrosilylation curable compositions of the various embodiments of the present invention has a ratio of the Young's modulus of the cured product after thermal aging at 225° C. for 48 hours versus the Young's modulus of the cured product before thermal aging at 225° C. for 48 hours of less than 4, e.g., less than 3.5, less than 3, less than 2.5, less than 2, less than 1.5, less than 1.0 or less than 0.5. In some embodiments, the cured product of curing the hydrosilylation curable compositions of the various embodiments of the present invention has a ratio of the Young's modulus of the cured product after thermal aging at 225° C. for 48 hours versus the Young's modulus of the cured product before thermal aging at 225° C. for 48 hours of about 1:1 to about 4:1, about 1:1 to about 3:1, about 1:1 to about 2:1 or about 1:1.

In some embodiments, the cured product of curing the hydrosilylation curable compositions of the various embodiments of the present invention have an elongation at break before thermal aging at 225° C. for 48 hours of about 20% to about 200% of about 20% to about 200%, e.g., from about 20% to about 150%, about 50% to about 200%, about 100% to about 200%, about 50% to about 150% or about 80% to about 160% (1 mm thick sample films were cut to dog-bone shaped specimens, followed by tensile measurement using an Instron Bluehill instrument).

In some embodiments, the cured product of curing the hydrosilylation curable compositions of the various embodiments of the present invention have an elongation at break before thermal aging at 225° C. for 48 hours of about 1% to about 100% of about 4% to about 75%, e.g., from about 4% to about 50%, about 10% to about 60%, about 10% to about 75%, about 15% to about 50% or about 15% to about 60% as measured using an Instron Bluehill instrument.

In some embodiments, the cured product of curing the hydrosilylation curable compositions of the various embodiments of the present invention has a Commission Internationale de l'Eclairage (CIE) b* value after aging for 72 h at 225° C. that is no more than about 7 (1 mm thick film of each sample was cut as 1×1 inch² specimens, followed by aging at 225° C. for 72 hours and then measuring b* values using a BYK colorimeter), e.g., no more than about 6, no more than about 4, no more than about 3, no more than about 2, no more than about 1, from about 1 to about 7, from about 1 to about 4, from about 2 to about 6, from about 1 to about 3 or from about 2 to about 5 as measured using a BYK Spectro-Guide instrument.

In some embodiments, the cured product of curing the hydrosilylation curable compositions of the various embodiments of the present invention can form coatings and films having an optical transmittance of visible light greater than 95%, even when the films reach a thickness of 1 millimeters (mm). In some embodiments, coatings and films derived from the cured product of curing the hydrosilylation curable compositions of the various embodiments of the present invention can have an optical transmittance of light having a wavelength from about 350 nanometers (nm) to about 1000 nm of at least 95%, e.g., at least 96%; at least 97%; at least 98%; at least 99%; or 100% transmittance of visible light, even when the films reach a thickness of from about 50 μm to about 500 μm or greater (e.g., 1 mm).

Cured Product

Curing the hydrosilylation curable compositions gives the cured product. In some embodiments the curing is hydrosilylation curing and the cured product is a hydrosilylation cured product. In other embodiments the curing is a combination of hydrosilylation curing and condensation curing and the cured product is a hydrosilylation cured and condensation cured product. In the latter dual curing embodiments, the hydrosilylation curing and condensation curing may be done sequentially (e.g., hydrosilylation curing followed by condensation curing), alternatively concurrently.

The cured product that results from curing the hydrosilylation curable compositions of the various embodiments of the present invention can generally have non-linear blocks and linear blocks predominately aggregated together in nano-domains within the cured product. As used herein, "predominately aggregated" means the majority of the non-linear blocks in the cured product are found in certain regions of the cured product, described herein as "nano-domains." As used herein, "nano-domains" refers to phase regions within the cured product that are phase separated and possess at least one dimension sized from 1 to 100 nanometers. The nano-domains may vary in shape, providing at least one dimension of the nano-domain is sized from 1 to 100 nanometers. The nano-domains can be regular or irregularly shaped. For example, the nano-domains may be spherically shaped, tubular shaped, and, in some instances, lamellar shaped. When a nano-domain is spherically shaped, the dimension sized from 1 to 100 nm is its diameter. When a nano-domain is tubular shaped, the dimension sized from 1 to 100 nm is its cross-sectional diameter.

The cured product that results from curing the hydrosilylation curable compositions of the various embodiments of the present invention can be an organosiloxane block copolymer. In some embodiments, the organosiloxane block copolymer can be an organosiloxane block copolymer comprising:

0 to 10 mole percent M constituent units of the formula $[R_3SiO_{1/2}]$, 40 to 90 mole percent D constituent units of the formula $[R_2SiO_{2/2}]$, and 10 to 80 mole percent T constituent units of the formula $[RSiO_{3/2}]$;

wherein:

the sum of the mole percent M, D, and T constituent units is ≤100 mole percent;

the cured product comprises 0.5 to 35 mole percent silicon bonded hydroxy (SiOH);

R is independently a $C_1$ to $C_{30}$ hydrocarbyl free of aliphatic unsaturation or a $C_1$ to $C_{30}$ hydrocarbyl group comprising at least one aliphatic unsaturated bond;

the D constituent units $[R_2SiO_{2/2}]$ are arranged in linear blocks having an average of from 50 to 300 D constituent units $[R_2SiO_{2/2}]$ per linear block;

the T constituent units $[RSiO_{3/2}]$ are arranged in non-linear blocks having a molecular weight of at least 500 g/mole;

the M constituent units $[R_3SiO_{1/2}]$ are connected to T units;

at least 30 mole % of the non-linear blocks are crosslinked with each other;

each linear block is linked to at least one non-linear block via —Si—O—Si— linkages;

the organosiloxane block copolymer has a weight average molecular weight of at least 20,000 g/mole; and the organosiloxane block copolymer comprises from about 0.5 to about 5 mole % $C_1$ to $C_{30}$ hydrocarbyl group comprising at least one aliphatic unsaturated bond. Alternatively in other embodiments, the organosiloxane block copolymer is as defined immediately above except wherein the mole percent of the T constituent units is 10 to 60 mole percent.

In some embodiments, at least 30 mole % of the non-linear blocks of the organosiloxane block copolymer are crosslinked with each other and are predominately aggregated together in nano-domains. The level of crosslinking can be determined by methods known in the art, including $^{29}Si$ Nuclear Magnetic Resonance (NMR) spectrometry. Aggregation into nano-domains can be also be determined by methods known in the art, including atomic force microscopy (AFM) as described, e.g., in WO2012/040302, which is incorporated by reference as if fully set forth herein.

In some embodiments, the cured product of the hydrosilylation curable compositions comprises a solid cured product or substantially solid cured product.

(g) Fillers and (h) Phosphors

The hydrosilylation curable compositions, and, in turn, the cured product of curing the hydrosilylation curable compositions, of the various embodiments of the present invention can contain a filler, as an optional component (g). The filler may comprise a reinforcing filler, an extending filler, a conductive filler, or a combination thereof. For example, the composition may optionally comprise a reinforcing filler, which, when present, may be added in an amount ranging from about 0.1% to about 95%, e.g., from about 2% to about 90%, from about 1 to about 60%; from about 25% to about 60%; from about 30% to about 60%; from about 40% to about 60%; from about 50 to about 60%; from about 25% to about 50%; from about 25% to about 40%; from about 25% to about 30%; from about 30% to about 40%; from about 30% to about 50%; or from about 40% to about 50%; based on the total weight of the hydrosilylation curable compositions.

In some embodiments, the amount of component (g) filler used may depend on a target hardness or modulus for, e.g., a solid cured product or substantially solid cured product of the hydrosilylation curable compositions described herein, such that higher target hardness and/or modulus may require higher filler loadings. Non-limiting examples of suitable reinforcing fillers include carbon black, zinc oxide, magnesium carbonate, aluminum silicate, sodium aluminosilicate, and magnesium silicate, as well as reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The hydrosilylation curable compositions, and, in turn, the cured product of curing the hydrosilylation curable compositions, of the various embodiments of the present invention may optionally comprise component (g) an extending filler in an amount ranging from about 0.1% to about 95%, e.g., from about 2% to about 90%, from about 1% to about 60%; from about 1 to about 20%; from about 25% to about 60%; from about 30% to about 60%; from about 40% to about 60%; from about 50% to about 60%; from about 25% to about 50%; from about 25% to about 40%; from about 25% to about 30%; from about 30% to about 40%; from about 30% to about 50%; or from about 40% to about 50%; based on the total weight of the composition. Non-limiting examples of extending fillers include crushed quartz, aluminum oxide, magnesium oxide, calcium carbonate such as precipitated calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, W. Va. Suitable precipitated calcium carbonates include Winnofil® SPM from Solvay and Ultrapflex® and Ultrapflex® 100 from SMI.

The hydrosilylation curable compositions, and, in turn, the cured product of curing the hydrosilylation curable compositions, of the various embodiments of the present invention may optionally comprise component (g) a conductive filler in an amount ranging from about 0.1% to about 95%, e.g., from about 2% to about 90%, from about 1% to about 60%; from about 1% to about 20%; from about 25% to about 60%; from about 30% to about 60%; from about 40% to about 60%; from about 50% to about 60%; from about 25% to about 50%; from about 25% to about 40%; from about 25% to about 30%; from about 30% to about 40%; from about 30% to about 50%; or from about 40% to about 50%; based on the total weight of the composition. Conductive fillers may be thermally conductive, electrically conductive, or both. Conductive fillers are known in the art and include metal particulates (such as aluminum, copper, gold, nickel, silver, and combinations thereof); such metals coated on nonconductive substrates; metal oxides (such as aluminum oxide, beryllium oxide, magnesium oxide, zinc oxide, and combinations thereof), meltable fillers (e.g., solder), aluminum nitride, aluminum trihydrate, barium titanate, boron nitride, carbon fibers, diamond, graphite, magnesium hydroxide, onyx, silicon carbide, tungsten carbide, and a combination thereof. Alternatively, other fillers may be added to the composition, the type and amount depending on factors including the end use of the cured product of the composition. Examples of such other fillers include magnetic particles such as ferrite; and dielectric particles such as fused glass microspheres, titania, and calcium carbonate.

The hydrosilylation curable compositions, and, in turn, the cured product of curing the hydrosilylation curable compositions, of the various embodiments of the present invention may include component (h) a phosphor in addition to component (g) a filler or instead of component (g) a filler. The component (h) a phosphor is not particularly limited and may include any phosphor known in the art. The component (h) phosphor may be in the form of a particulate solid, alternatively a layer of a particulate solid phosphor disposed in a host matrix material (e.g., in a silicone matrix). In one embodiment, the phosphor is made from a host material and an activator, such as copper-activated zinc sulfide and silver-activated zinc sulfide. Suitable but non-limiting host materials include oxides, nitrides and oxynitrides, sulfides, selenides, halides or silicates of zinc, cadmium, manganese, aluminum, silicon, or various rare earth metals. Additional suitable phosphors include, but are not limited to, $Zn_2SiO_4$:Mn (Willemite); ZnS:Ag+(Zn,Cd)S:Ag; ZnS:Ag+ZnS:Cu+ $Y_2O_2S$:Eu; ZnO:Zn; KCl; ZnS:Ag,Cl or ZnS:Zn; (KF, $MgF_2$):Mn; (Zn,Cd)S:Ag or (Zn,Cd)S:Cu; $Y_2O_2S$:Eu+ $Fe_2O_3$, ZnS:Cu,Al; ZnS:Ag+Co-on-$Al_2O_3$; (KF,$MgF_2$):Mn; (Zn,Cd)S:Cu,Cl; ZnS:Cu or ZnS:Cu,Ag; $MgF_2$:Mn; (Zn,Mg)$F_2$:Mn; $Zn_2SiO_4$:Mn,As; ZnS:Ag+(Zn,Cd)S:Cu; $Gd_2O_2S$:Tb; $Y_2O_2S$:Tb; $Y_3Al_5O_{12}$:Ce; $Y_2SiO_5$:Ce; $Y_3Al_5O_{12}$:Tb; ZnS:Ag,Al; ZnS:Ag; ZnS:Cu,Al or ZnS:Cu,Au,Al; (Zn,Cd)S:Cu,Cl+(Zn,Cd)S:Ag,Cl; $Y_2SiO_5$:Tb; $Y_2OS$:Tb; $Y_3(Al,Ga)_5O_{12}$:Ce; $Y_3(Al,Ga)_5O_{12}$:Tb; $InBO_3$:Tb; $InBO_3$:Eu; $InBO_3$:Tb+$InBO_3$:Eu; $InBO_3$:Tb+$InBO_3$:Eu+ZnS:Ag; (Ba,Eu)$Mg_2Al_{16}O_{27}$; (Ce,Tb)$MgAl_{11}O_{19}$; $BaMgAl_{10}O_{17}$:Eu,Mn; $BaMg_2Al_{16}O_{27}$:Eu(II); $BaMgAl_{10}O_{17}$:Eu,Mn; $BaMg_2Al_{16}O_{27}$:Eu(II),Mn(II); $Ce_{0.67}Tb_{0.33}MgAl_{11}O_{19}$:Ce,Tb; $Zn_2SiO_4$:Mn,$Sb_2O_3$; $CaSiO_3$:Pb,Mn; $CaWO_4$ (Scheelite); $CaWO_4$:Pb; $MgWO_4$; (Sr,Eu,Ba,Ca)$_5$(PO$_4$)$_3$Cl; $Sr_5Cl(PO_4)_3$:Eu(II); (Ca,Sr,Ba)$_3$(PO$_4$)$_2Cl_2$:Eu; (Sr,Ca,Ba)$_{10}$(PO$_4$)$_6Cl_2$:Eu; $Sr_2P_2O_7$:Sn(II); $Sr_6P_5BO_{20}$:Eu; $Ca_5F(PO_4)_3$:Sb; (Ba,Ti)$_2P_2O_7$:Ti; $3Sr_3$(PO$_4$)$_2$.$SrF_2$:Sb,Mn; $Sr_5F(PO_4)_3$:Sb,Mn; $Sr_5F(PO_4)_3$:Sb,Mn; $LaPO_4$:Ce,Tb; (La,Ce,Tb)PO$_4$; (La,Ce,Tb)PO$_4$:Ce,Tb; $Ca_3(PO_4)_2$.$CaF_2$:Ce,Mn; (Ca,Zn,Mg)$_3$(PO$_4$)$_2$:Sn; (Zn,Sr)$_3$(PO$_4$)$_2$:Mn; (Sr,Mg)$_3$(PO$_4$)$_2$:Sn; (Sr,Mg)$_3$(PO$_4$)$_2$:Sn(II); $Ca_5F(PO_4)_3$:Sb,Mn; $Ca_5(F,Cl)(PO_4)_3$:Sb,Mn; (Y,Eu)$_2O_3$; $Y_2O_3$:Eu(III); $Mg_4(F)GeO_6$:Mn; $Mg_4(F)(Ge,Sn)O_6$:Mn; Y(P,V)$O_4$:Eu; $YVO_4$:Eu; $Y_2O_2S$:Eu; 3.5 MgO.0.5 $MgF_2$.$GeO_2$:Mn; $Mg_5As_2O_{11}$:Mn; $SrAl_2O_7$:Pb; $LaMgAl_{11}O_{19}$:Ce; $LaPO_4$:Ce; $SrAl_{12}O_{19}$:Ce; $BaSi_2O_5$:Pb; $SrFB_2O_3$:Eu(II); $SrB_4O_7$:Eu; $Sr_2MgSi_2O_7$:Pb; $MgGa_2O_4$:Mn(II); $Gd_2O_2S$:Tb; $Gd_2O_2S$:Eu; $Gd_2O_2S$:Pr; $Gd_2O_2S$:Pr,Ce,F; $Y_2O_2S$:Tb; $Y_2O_2S$:Eu; $Y_2O_2S$:Pr; Zn(0.5)Cd(0.4)S:Ag; Zn(0.4)Cd(0.6)S:Ag; $CdWO_4$; $CaWO_4$; $MgWO_4$; $Y_2SiO_5$:Ce; $YAlO_3$:Ce; $Y_3Al_5O_{12}$:Ce; $Y_3(Al,Ga)_5O_{12}$:Ce; CdS:In; ZnO:Ga; ZnO:Zn; (Zn,Cd)S:Cu,Al; ZnS:Cu,Al,Au; ZnCdS:Ag,Cu; ZnS:Ag; anthracene, EJ-212, $Zn_2SiO_4$:Mn; ZnS:Cu; NaI:Tl; CsI:Tl; LiF/ZnS:Ag; LiF/ZnSCu,Al,Au, and combinations thereof.

The amount of component (h) phosphor added to the hydrosilylation curable compositions, and, in turn, the cured product of curing the hydrosilylation curable compositions, of the various embodiments of the present invention may vary and is not limiting. When present, the phosphor may be added in an amount ranging from about 0.1% to about 95%, e.g., from about 5% to about 80%, from about 1% to about 60%; from about 25% to about 60%; from about 30% to about 60%; from about 40% to about 60%; from about 50% to about 60%; from about 25% to about 50%; from about 25% to about 40%; from about 25% to about 30%; from about 30% to about 40%; from about 30% to about 50%; or from about 40% to about 50%; based on the total weight of the composition.

In some embodiments the invention comprises any one of the following numbered aspects:

Aspect 1. A hydrosilylation curable composition comprising components (a), (b), and (e) and at least one of components (c) and (d): (a) a resin material having the unit formula $[R^1R^2R^3SiO_{1/2}]_a[R^1R^2R^4SiO_{1/2}]_b[R^1R^5SiO_{2/2}]_c[R^1SiO_{3/2}]_d$, wherein $R^1$, $R^2$, and $R^3$ are independently a $C_1$ to $C_{30}$ hydrocarbyl group free of aliphatic unsaturation, and $R^4$ and $R^5$ are independently a $C_1$ to $C_{30}$ hydrocarbyl group free of aliphatic unsaturation or a $C_2$ to $C_{30}$ hydrocarbyl group comprising aliphatic unsaturation, $0 \le$ subscript a $<0.1$, $0 <$ subscript b $<0.2$, $0 \le$ subscript c $<0.1$, subscript d $=(1-a-b-c)$, the resin material has a weight average molecular weight of about 1500 grams per mole (g/mole) and about 5000 g/mole, and the resin material has a mole ratio of silicon bonded hydroxy (SiOH) to resin material of about 0.05 to about 0.5; (b) a crosslinker having the unit formula $[R^1R^2R^8SiO_{1/2}]_e[R^1R^9SiO_{2/2}]_f[R^1SiO_{3/2}]_g$, wherein $R^1$ and $R^2$ are independently a $C_1$ to $C_{30}$ hydrocarbyl free of aliphatic unsaturation, $R^8$ and $R^9$ are independently a H, a $C_1$ to $C_{30}$ hydrocarbyl free of aliphatic unsaturation or a silane radical of the formula —$[R^{10}R^{11}Si]_p[R^{10}R^{11}SiH]$ (wherein $R^{10}$, $R^{11}$ is independently a H or a $C_1$ to $C_{30}$ hydrocarbyl free of aliphatic unsaturation, subscript p is an integer from 0 to 10), subscript e is an integer from 0 to 10, subscript f is an integer from 0 to 10, subscript g is an integer from 0 to 20, and the number of SiH groups in the crosslinker is ≥2 per crosslinker molecule; and (e) a hydrosilylation catalyst; and at least one of: (c) an SiH siloxane having the formula $[R^1R^2R^6SiO_{1/2}][R^1R^2SiO_{2/2}]_m[O_{1/2}SiR^6R^2R^1]$, wherein $R^1$ and $R^2$ is independently a $C_1$ to $C_{30}$ hydrocarbyl free of aliphatic unsaturation, $R^6$ independently is H or a silane radical of the formula —$[SiR^1R^2]_p[R^1R^2SiH]$, wherein subscript p is an integer from 0 to 10, and subscript m is an integer from 20 to 200; and (d) an organosiloxane comprising at least two silicon atom-bonded hydrocarbyl groups comprising aliphatic unsaturation having the unit formula $[R^1R^2R^7SiO_{1/2}][^1R^2SiO_{2/2}]_n[O_{1/2}SiR^7R^1R^2]$ wherein $R^1$ and $R^2$ is independently a $C_1$ to $C_{30}$ hydrocarbyl free of aliphatic unsaturation, $R^7$ is a $C_2$ to $C_{30}$ hydrocarbyl comprising aliphatic unsaturation, and subscript n is an integer from 20 to 200. p Aspect 2. The hydrosilylation curable composition of aspect 1, wherein the curable composition comprises component combinations selected from the group consisting of: components (a), (b), (d), and (e); components (a), (b), (c), and (e); and components (a), (b), (c), (d), and (e).

Aspect 3. The hydrosilylation curable composition of any preceding aspect, wherein $R^4$ or $R^7$ is vinyl.

Aspect 4. The hydrosilylation curable composition of any preceding aspect, wherein subscript f or g is 0.

Aspect 5. The hydrosilylation curable composition of any preceding aspect, comprising a crosslinker of the formula $[R^1R^2R^8SiO_{1/2}]_e[R^1R^9SiO_{2/2}]_f$ and a crosslinker of the formula $[R^1R^2R^8SiO_{1/2}]_e[R^1SiO_{3/2}]_g$ in a ratio of about 5:1 to about 3:1 w/w and wherein $R^1$, $R^2$, $R^8$, $R^9$, subscript e, subscript f, and subscript g independently are as defined in aspect 1, 2, 3, or 4, respectively.

Aspect 6. The curable composition of any preceding aspect, wherein $0.05 <$ subscript b $<0.15$ or $0.08 <$ subscript b $<0.15$.

Aspect 7. The hydrosilylation curable composition of any preceding aspect, wherein the resin material has a weight average molecular weight of about 2400 g/mole to 3600 g/mole.

Aspect 8. The hydrosilylation curable composition of any preceding aspect, wherein the resin material has a mole ratio of silicon bonded hydroxy (SiOH) to resin material of about 0.1 to about 0.3.

Aspect 9. The hydrosilylation curable composition of any preceding aspect, wherein subscript m is an integer from 50 to 150.

Aspect 10. The hydrosilylation curable composition of any preceding aspect, wherein subscript n is an integer from 50 to 150.

Aspect 11. The hydrosilylation curable composition of any preceding aspect, wherein the curable composition further comprises (f) a condensation catalyst.

Aspect 12. The hydrosilylation curable composition of any preceding aspect, wherein the curable composition is flowable at 20 degrees Celsius (° C.) and 101.3 kilopascals (kPa).

Aspect 13. The hydrosilylation curable composition of any preceding aspect, wherein the curable composition has a cure speed in Pascals per minute (Pa/min) of from about 0.5 to about 10 Pa/min by 150° C. isothermal rheology measurements.

Aspect 14. The hydrosilylation curable composition of any preceding aspect, further comprising component (g) a filler or component (h) a phosphor. In some aspects the hydrosilylation curable composition further comprises the component (g) a filler; alternatively component (h) a phosphor; alternatively both component (g) a filler and component (h) a phosphor.

Aspect 15. A cured product of curing the hydrosilylation curable composition of any preceding aspect.

Aspect 16. The cured product of aspect 11, wherein the cured product has a Young's modulus of about 20 MPa to about 300 MPa after thermal aging at 225° C. for 48 hours.

Aspect 17. The cured product of aspect 11 having a Young's modulus before thermal aging and a Young's modulus after thermal aging at 225° C. for 48 hours, wherein the ratio of the Young's modulus of the cured product after thermal aging at 225° C. for 48 hours versus the Young's modulus of the cured product before thermal aging is less than 4.

Aspect 18. The cured product of any one of aspects 11 to 17, wherein the cured product has an elongation at break before thermal aging at 225° C. for 48 hours of about 20% to about 200%.

Aspect 19. The cured product of any one of aspects 11 to 18, wherein the CIE b* value after aging for 72 hours at 225° C. is from 0 to about 7.

Aspect 20. The cured product of any one of aspects 11 to 19, wherein the cured product is an organosiloxane block copolymer comprising: 0 to 10 mole percent M constituent units of the formula $[R_3SiO_{1/2}]$, 40 to 90 mole percent D constituent units of the formula $[R_2SiO_{2/2}]$, and 10 to 60 mole percent T constituent units of the formula $[RSiO_{3/2}]$; wherein: the sum of the mole percent M, D, and T constituent units is ≤100 mole percent; the cured product comprises 0.5 to 35 mole percent silicon bonded hydroxy (SiOH); R is independently a $C_1$ to $C_{30}$ hydrocarbyl free of aliphatic unsaturation or a $C_1$ to $C_{30}$ hydrocarbyl group comprising at least one aliphatic unsaturated bond; the D constituent units $[R_2SiO_{2/2}]$ are arranged in linear blocks having an average of from 50 to 300 D constituent units $[R_2SiO_{2/2}]$ per linear block; the T constituent units $[RSiO_{3/2}]$ are arranged in non-linear blocks having a molecular weight of at least 500 g/mole; the M constituent units $[R_3SiO_{1/2}]$ are connected to T units; at least 30% of the non-linear blocks are crosslinked with each other; each linear block is linked to at least one non-linear block via —Si—O—Si— linkages; the organosiloxane block copolymer has a weight average molecular weight of at least 20,000 g/mole; and the organosiloxane block copolymer comprises from about 0.5 to about 5 mole $C_1$ to $C_{30}$ hydrocarbyl group comprising at least one aliphatic unsaturated bond.

Aspect 21. The cured product of any one of aspects 15 to 20, wherein the curing is hydrosilylation curing.

Aspect 21. The cured product of any one of aspects 15 to 20, wherein the hydrosilylation curable composition further comprises (f) a condensation catalyst and the curing is hydrosilylation curing and condensation curing.

The description of this invention uses certain terms and expressions. As used herein, "alternatively" refers to a separate and distinct embodiment. "Contacting" means bringing into physical contact. "Operative" means functionally effective, wherein the effect may be a direct effect, alternatively an indirect affect. For example, reactants may be brought into direct physical contact in a reaction thereof, with or without a catalyst; and components of an article or device may be brought into "operative contact," which includes direct physical touching, alternatively indirect touching via one or more intermediary components. "Optionally" means is absent, alternatively is present. Any Markush group comprising a genus and subgenus therein includes the subgenus in the genus, e.g., in "R is hydrocarbyl or alkenyl," R may be alkenyl, alternatively R may be hydrocarbyl, which includes, among other subgenuses, alkenyl. As used herein, "may" confers a choice, not an imperative. All "molecular weight" of a macromolecular material, such as a number average molecular weight ($M_n$) or weight average molecular weight ($M_w$) of a polymer, is determined using gel permeation chromatography and polystyrene standards unless noted herein otherwise. "Silicone" includes linear, branched, or a mixture of linear and branched polyorganosiloxane macromolecules. All weight percents are, unless otherwise noted, based on total weight of all ingredients or constituents used to make the composition or formulation, which adds up to 100 weight percent.

The term "about," as used herein, can allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

Embodiments of the invention described and claimed herein are not to be limited in scope by the specific embodiments herein disclosed, since these embodiments are intended as illustration of several aspects of the disclosure. Any equivalent embodiments are intended to be within the scope of this disclosure. Indeed, various modifications of the embodiments in addition to those shown and described herein will become apparent to those skilled in the art from the foregoing description. Such modifications are also intended to fall within the scope of the appended claims.

The Abstract is provided to allow the reader to quickly ascertain the nature of the technical disclosure. It is submitted with the understanding that it will not be used to interpret or limit the scope or meaning of the claims.

EXAMPLES

The following examples are included to demonstrate specific embodiments of the invention. However, those of skill in the art should, in light of the present disclosure, appreciate that many changes can be made in the specific embodiments which are disclosed and still obtain a like or similar result without departing from the spirit and scope of the invention.

A summary of the examples presented herein is given in Tables 1a and 1b.

TABLE 1a

| Example | Formulation |
|---|---|
| 1 | $M^{Vi}_{0.12}T^{PH}_{0.88} + M^{Vi}_2D^{PH}_{80} + M^H_2D^{PH2} + M^H_{60}T^{PH}_{40}$ + Pt cat., (SiH/Vi = 1) |
| 2 | $M^{Vi}_{0.12}T^{PH}_{0.88} + M^H_2D^{PH}_{121} + M^H_2D^{PH2}$ + Pt cat., (SiH/Vi = 1) |
| 3 | $M^{Vi}_{0.12}T^{PH}_{0.88} + M^H_2D^{PH}_{121} + M^H_2D^{PH2}$ + PT cat. + DBU, (SiH/Vi = 1) |
| 4 | $M^{Vi}_{0.14}T^{PH}_{0.86} + M^H_2D^{PH}_{146} + M^{vi}_2D^{PH}_{20} + M^H_2D^{PH2}$ + Pt cat. + DBU, (SiH/Vi = 1) |
| 5 | $M^{Vi}_{0.14}T^{PH}_{0.86} + M^H_2D^{PH}_{146} + M^H_2D^{PH2}$ + Pt cat. + DBU, (SiH/Vi = 1) |
| 6 | $M^{Vi}_{0.14}T^{PH}_{0.86} + M^H_2D^{PH}_{146} + M^H_2D^{PH2} + M^H_{60}T^{PH}_{40}$ + Pt cat., (SiH/Vi = 1) |
| 7 | $M_{0.14}D^{Vi}_{0.10}T^{PH}_{0.76} + M^H_2D^{PH}_{51} + M^H_{60}T^{PH}_{40}$ + Pt cat., (SiH/Vi = 1) |
| 8 | $M_{0.14}D^{Vi}_{0.10}T^{PH}_{0.76} + M^H_2D^{PH}_{146} + M^H_{60}T^{PH}_{40}$ + Pt cat., (SiH/Vi = 1) |

TABLE 1b

| | Formulation details | | | |
|---|---|---|---|---|
| Example | Resin | Linear | Vi (mol %) | Resin (wt %) |
| 1 | $M^{Vi}_{0.12}T^{PH}_{0.88}$ | $M^{Vi}_2D^{PH}_{80}$ | 12.1 | 50.4 |
| 2 | $M^{Vi}_{0.12}T^{PH}_{0.88}$ | $M^H_2D^{PH}_{121}$ | 12.1 | 49.8 |
| 3 | $M^{Vi}_{0.12}T^{PH}_{0.88}$ | $M^H_2D^{PH}_{121}$ | 12.1 | 49.8 |
| 4 | $M^{Vi}_{0.12}T^{PH}_{0.86}$ | $M^H_2D^{PH}_{146}$ | 14.1 | 49.9 |
| 5 | $M^{Vi}_{0.14}T^{PH}_{0.86}$ | $M^H_2D^{PH}_{146}$ | 14.1 | 45.1 |
| 6 | $M^{Vi}_{0.14}T^{PH}_{0.86}$ | $M^H_2D^{PH}_{146}$ | 14.1 | 45.1 |
| 7 | $M_{0.14}D^{Vi}_{0.10}T^{PH}_{0.76}$ | $M^H_2D^{PH}_{51}$ | 10 | 62 |
| 8 | $M_{0.14}D^{Vi}_{0.10}T^{PH}_{0.76}$ | $M^H_2D^{PH}_{146}$ | 10 | 55 |

Example 1

Loaded a 2 liter (L) 3-neck round bottom flask with Dow Corning 217 Flake phenyl-T resin (550.0 grams (g)) and toluene (725.0 g). The flask was equipped with a poly (tetrafluoroethylene) stir paddle, thermometer and a water-cooled condenser. System was setup to capture HCl gas in a water trap. Loaded an addition funnel with toluene (100.0 g) and chlorodimethylvinylsilane (78.00 g, 0.655 moles).

Dissolved resin completely and then added the chlorosilane solution slowly at room temperature. Heated at 50° C. for 2 hours. Stopped mixing and removed aqueous phase. Heated at 60° C. for 1 hour. Water washed several times at 80° C. using 40 milliliters (mL) deionized (DI) water amounts for each wash to remove residual HCl. Heated to reflux and removed residual water by azeotropic distillation. Stripped resin to dryness using a rotary evaporator at an oil bath temperature of 140° C. and ~1 mm Hg. Product was a clear, crunchy solid at room temperature with a $T_g=56°$ C., $M_n=1,720$, $M_w=2,660$ (relative to polystyrene standards). Product composition by $^{29}$Si NMR ($M^{Vi}_{0.12}T^{Ph}_{0.88}$), SiOH=28.3 mol %.

Formulation:

Part A: 10.8 g $M^{Vi}_{0.12}T^{Ph}_{0.88}$ resin was dissolved in 15 mL toluene. To the toluene solution was added 8 g $M^H_2D^{Ph}_{80}$, 1.573 g $M^H_2D^{Ph2}$ and 0.366 g $M^H_{60}T^{Ph}_{40}$. The toluene was removed from the system at 90° C. and 5 mm Hg vacuum with rotary evaporator.

Part B: $M^{Vi}_2D^{Ph}_{80}$ (0.5 g) was combined with 0.107 g Pt catalyst using speed mixer.

Part A and Part B was combined well and then cured at 120° C. for 1 hour and 160° C. for 3 hours.

Example 2

A 1 L 4-neck round bottom flask was loaded with Dow Corning short chain OH terminated phenyl-methyl siloxane polymer (2640.0 g). The flask was equipped with a poly (tetrafluoroethylene) stir paddle, thermometer, and a water-cooled condenser attached to collection flask setup to collect water. A nitrogen sweep was applied. The polymer was heated to 110° C. and then added an aqueous solution (3 wt %) of KOH (2.19 g). Heating was continued at 110° C. for 7 hours 50 minutes, at which point the reaction mixture was neutralized with aqueous phosphoric acid (2.5 wt %) (6.91 g). Cooled to near room temperature and then added some toluene (293.0 g) to reduce the viscosity. The mixture was mixed overnight at room temperature. The polymer was stripped using a thin film evaporator at a jacket temperature of 235° C. and ~0.2 mm Hg. The stripped polymer was dissolved in toluene at 65 wt % and then added Darco G60 activated carbon black (1 wt % based on polymer) and mixed overnight at room temperature. Filtered product solution through a 0.45 µm filter. Polymer dp=121 as measured from $^{29}$Si NMR, wherein dp is degree of polymerization.

A 1 L 3-neck flask was dried in 100° C. oven for two hours and then installed and cooled the flask under $N_2$. The toluene solution of $D^{Ph}_{121}OH_2$ containing 308.2 g $D^{Ph}_{121}OH_2$ (474 g, 65 wt % solution) was added into the flask under nitrogen, followed by adding 300 mL anhydrous toluene to dilute the solution to 40 weight percent (wt %). Triethylamine (TEA; 5 mL) was added into the mixture under nitrogen, followed by stirring for 10 min, and then 4 mL $Me_2SiHCl$ was slowly injected into the reaction mixture by syringe under nitrogen within 10 min. A white precipitate formed in the solution as soon as $Me_2SiHCl$ was added. The cloudy reaction solution was stirred at room temperature and nitrogen for several hours to complete the reaction, followed by adding 150 µL deionized $H_2O$ to quench the excess $Me_2SiHCl$ and then adding 10 g $Na_2SO_4$ anhydrous to dry the reaction mixture overnight. The clear solution was obtained by filtering the mixture with 1.2 µm filter paper under 30 psi air pressure. About 306 g clear SiH capped siloxane product ($M^H_2D^{Ph}_{121}$) was obtained by removing toluene and the trace of TEA at 90° C. and 5 mm Hg vacuum with rotary evaporator.

Formulation:

Part A: 10.5 g $M^{Vi}_{0.12}T^{Ph}_{0.88}$ resin was dissolved in 15 mL toluene. To this solution was added 9 g $M^H_2D^{Ph}_{121}$ and 1.575 g $M^H_2D^{Ph2}$. Toluene was removed from the system at 90° C. and 5 mmHg vacuum with rotary evaporator.

Part B: 0.105 g Pt catalyst (Dow Corning produced Pt catalysts).

Part A and Part B was mixed well and then cured at 120° C. for 1 hour and 160° C. for 3 hours.

Example 3

Part A: 10.5 g $M^{Vi}_{0.12}T^{Ph}_{0.88}$ resin was dissolved in 15 mL toluene. To the toluene solution was added 9 g $M^H_2D^{Ph}_{121}$, 1.575 g $M^H_2D^{Ph2}$, and DBU (1,8-Diazabicyclo[5.4.0]undec-7-ene). Toluene was removed from the system at 90° C. and 5 mm Hg vacuum with rotary evaporator.

Part B: 0.105 g Pt catalyst (Dow Corning produced Pt catalysts).

Part A and Part B was mixed well and then cured at 120° C. for 1 hour and 160° C. for 3 hours.

Example 4

A 3 L 3-neck round bottom indented Morton type flask was loaded with DI water (741.2 g). The flask was equipped with a poly(tetrafluoroethylene) stir paddle, thermometer, and a water-cooled condenser. The water was cooled down to 5° C. using an ice-water bath. A pre-mixed solution of phenyltrichlorosilane (355.4 g, 1.680 moles), vinyldimethylchlorosilane (38.61 g, 0.320 moles), and toluene (385.2 g) was added slowly with an addition funnel. The ice-water bath was immediately removed after addition was complete, and then a heating mantle was applied. Continued to mix for 15 minutes with no additional heat applied. Transferred reaction mixture into a 2 L round bottom flask with a bottom drain and then removed the aqueous layer. Added DI water (64.2 g), heated at 80° C. for 10 minutes and then removed the aqueous phase. Repeated the following process several times until the final wash water had a pH of 4.0. Added 2-propanol (16.05 g) and DI water (48.15 g), heated at 80° C. for 10 minutes and removed aqueous phase. Heated to reflux and removed residual water via azeotropic distillation. Distilled off volatiles (191.2 g) to remove residual 2-propanol reaching a vapor temperature of 110° C. Added toluene (153.0 g) to reduce the solids content to ~40 wt %. Heated to 85° C. and then added a solution of 5 wt % dimethylamine in water (0.205 g). Heated at reflux for around 2 hours at 85° C. added more 5 wt % dimethylamine in water solution (0.103 g). Heated at reflux for ~130 minutes. Washed four times at 80° C. using 25 mL of DI water for each wash. Heated to reflux and removed residual water by azeotropic distillation. Stripped resin to dryness using a rotary evaporator at an oil bath temperature of 150° C. and ~1 mm Hg. Product was a crunchy solid at room temperature with an $M_n=2,070$; $M_w=3,490$ (relative to polystyrene standards). Product composition by $^{29}$Si NMR ($M^{Vi}_{0.14}T^{Ph}_{0.86}$), SiOH=24.8 mol %

OH terminated siloxane, $D^{Ph}_{146}OH_2$, is a Dow Corning intermediate which was ordered from DC manufacture.

A 1 L 3-neck flask was dried in 100° C. oven for two hours and then installed and cooled the flask under $N_2$. 301.6 g (464 g 65 wt % solution) $D^{Ph}_{146}OH_2$ was added into the flask under nitrogen, followed by adding 200 mL anhydrous toluene to dilute the solution to 45 wt %. To the toluene solution was added 6.3 mL triethylamine (TEA) under nitrogen, followed by stirring for 10 minutes, and then 5 mL Me$_2$SiHCl was slowly injected into the reaction mixture by syringe under nitrogen within 10 minutes. A white precipitate formed in the solution immediately after Me$_2$SiHCl was added. The cloudy reaction solution was stirred at room temperature and nitrogen for several hours to complete the reaction, followed by adding 400 µL deionized H$_2$O to quench the excess Me$_2$SiHCl and then adding 10 g Na$_2$SO4 anhydrous to dry the reaction mixture overnight. The clear solution was obtained by filtering the mixture with 1.2 µm filter paper under 30 psi air pressure. About 300 g clear SiH capped siloxane product ($M^H_2 D^{Ph}_{1461}$) was obtained by removing toluene and the trace of TEA at 90° C. and 5 mmHg vacuum with rotary evaporator.

Formulation:

Part A: 10.4 g $M^{Vi}_{0.14} T^{Ph}_{0.86}$ resin was dissolved in 15 mL toluene. To the toluene solution was added 7.2 g $M^H_2 D^{Ph}_{146}$, 1.2 g $M^{Vi}_2 D^{Ph}_{20}$, 2.25 g $M^H_2 D^{Ph2}$, and DBU. Toluene was removed from the system at 90° C. and 5 mmHg vacuum with rotary evaporator.

Part B: 0.104 g Pt catalyst (Dow Corning produced Pt catalysts).

Part A and Part B was mixed well and then at 120° C. for 1 hour and 160° C. for 3 hours.

Example 5

Part A: 9.6 g $M^{Vi}_{0.14} T^{Ph}_{0.86}$ resin was dissolved in 15 mL toluene. To the toluene solution was added 10 g $M^H_2 D^{Ph}_{146}$, 1.7 g $M^H_2 D^{Ph2}$, and DBU. Toluene was removed from the system at 90° C. and 5 mmHg vacuum with rotary evaporator.

Part B: 0.106 g Pt catalyst (Dow Corning produced Pt catalysts).

Part A and Part B was mixed well and cured at 120° C. for 1 hour and 160° C. for 3 hours.

Example 6

Part A: 9.6 g $M^{Vi}_{0.14} T^{Ph}_{0.86}$ resin was dissolved in 15 mL toluene. To the toluene solution was added 10 g $M^H_2 D^{Ph}_{146}$, 1.36 g $M^H_2 D^{Ph2}$, and 0.316 g $M^H_{60} T^{Ph}_{40}$. Toluene was removed from the system at 90° C. and 5 mmHg vacuum with rotary evaporator.

Part B: 0.106 g Pt catalyst (Dow Corning produced Pt catalysts).

Part A and Part B was mixed well and cured at 120° C. for 1 hour and 160° C. for 3 hours.

Example 7

A 3 L 3-neck round bottom indented Morton type flask was loaded with phenyltrimethoxysilane (267.7 g, 1.35 mols), hexamethyldisiloxane (21.92 g, 0.27 mol) and methylvinyldimethoxysilane (23.8 g, 0.18 mol), followed by adding 92 µL FC24 (500 ppm in reaction mixture). The flask was equipped with a poly(tetrafluoroethylene) stir paddle, thermometer, and a water-cooled condenser. DI water (43.7 g, 2.426 mols) was added slowly at room temperature (about 25° C.) and the temperature rose up to 54° C. with the completion of adding water, followed by heating at 60° C. for 3 hours. Then, about 127.4 g methanol formed was removed at 85° C. 114 g toluene was added to make the NVC of the formed resin about 65%. 1.46 g KOH solution (10 wt % in water) was added to neutralize FC24 and base body the resin. Aqueous phase was removed by refluxing and then the mixture was refluxed for 3 hours. 0.7 g HCl solution (10 wt % in water) was added at 80° C., followed by stirring to mix them until cooling to room temperature. The reaction mixture was transferred into a 1 L round bottom flask with a bottom drain, followed by adding 203.75 g toluene and washing with 50 mL water for three times at 80° C. Residual water was removed by azeotropic distillation. The mixture was filtered through a 5 µm filter and stripped to dry using a rotovapor at 125° C. Product composition by $^{29}$Si NMR ($M_{0.14} D^{Vi}_{0.1} T^{Ph}_{0.76}$).

OH terminated siloxane, $D^{Ph}_{51} OH_2$, is a Dow Corning intermediate which was ordered from DC manufacture.

A 1 L 3-neck flask was dried in 100° C. oven for two hours and then installed and cooled the flask under N$_2$. 196.5 g (302.3 g 65 wt % solution) $D^{Ph}_{51} OH_2$ was added into the flask under nitrogen, followed by adding 100 mL anhydrous toluene to dilute the solution to 50 wt %. To the toluene solution was added 10.6 mL triethylamine (TEA) under nitrogen, followed by stirring for 10 minutes, and then 8.4 mL Me$_2$SiHCl was slowly injected into the reaction mixture by syringe under nitrogen within 6 minutes. A white precipitate formed in the solution immediately after Me$_2$SiHCl was added. The cloudy reaction solution was stirred at room temperature and nitrogen for several hours to complete the reaction, followed by adding 500 µL deionized H$_2$O to quench the excess Me$_2$SiHCl and then adding 10 g Na$_2$SO4 anhydrous to dry the reaction mixture overnight. The clear solution was obtained by filtering the mixture with 1.2 µm filter paper under 30 psi air pressure. About 181 g clear SiH capped siloxane product ($M^H_2 D^{Ph}_{51}$) was obtained by removing toluene and the trace of TEA at 90° C. and 5 mmHg vacuum with rotary evaporator.

Formulation:

Part A: 7 g $M_{0.14} D^{Vi}_{0.1} T^{Ph}_{0.76}$ resin was dissolved in 7 g toluene. To the toluene solution was added 3.5 g $M^H_2 D^{Ph}_{51}$, 0.814 g $M^H_{60} T^{Ph}_{40}$. Toluene was removed from the system at 90° C. and 5 mmHg vacuum with rotary evaporator.

Part B: 0.226 g Pt catalyst (Dow Corning produced Pt catalysts to make 2 ppm Pt in the formulation).

Part A and Part B was mixed well and then cured at 120° C. for 1 hour and 160° C. for 3 hours.

Example 8

Formulation:

Part A: 6 g $M_{0.14} D^{Vi}_{0.1} T^{Ph}_{0.76}$ resin was dissolved in 7 g toluene. To the toluene solution was added 4.15 g $M^H_2 D^{Ph}_{146}$, 0.763 g $M^H_{60} T^{Ph}_{40}$. Toluene was removed from the system at 90° C. and 5 mmHg vacuum with rotary evaporator.

Part B: Part B: 0.11 g Pt catalyst (Dow Corning produced Pt catalysts to make 1 ppm Pt in the formulation).

Part A and Part B was mixed well and then cured at 120° C. for 1 hour and 160° C. for 3 hours.

The Young's modulus of selected cured hydrosilylation curable compositions of the various embodiments of the present invention before and after thermal aging at 225° C. for 48 hours; elongation at break before and after thermal aging of selected cured hydrosilylation curable compositions of the various embodiments of the present invention; and the CIE b* values before and after aging for 72 hours at 225 degrees Celsius (° C.) of selected cured hydrosilylation curable compositions of the various embodiments of the present invention are given below in Table 2.

TABLE 2

| Example | Young's Modulus before thermal aging (MPa) | Young's Modulus after thermal aging (MPa) | % Elongation at break before thermal aging | % Elongation at break after thermal aging | CIE b* before aging | CIE b* after aging |
|---|---|---|---|---|---|---|
| 1 | 0.6 | 3.63 | 32.80 | 7.5 | 0.6 | 3.63 |
| 2 | 43.6 | 122.7 | 91.90 | 29.20 | 1.18 | 2.41 |
| 3 | 93 | 153.1 | 35 | 14.60 | 0.65 | 2.47 |
| 4 | 101.8 | 200.6 | 22 | 5.84 | 1.61 | 6.45 |
| 5 | 46.4 | 123 | 45.50 | 10.60 | Not determined | Not determined |
| 6 | 44.2 | 119.1 | 22 | 5.84 | 0.83 | 5.07 |
| 7 | 125 | 221 | 41.7 | 15 | Not determined | Not determined |
| 8 | 56 | 61.5 | 72.2 | 42 | Not determined | Not determined |

In some embodiments the invention comprises the hydrosilylation curable composition as formulated in any one of Examples 1 to 7, alternatively any one of Examples 1 to 8. In some embodiments the hydrosilylation curable composition is selected from a group of any six of the hydrosilylation curable compositions of Examples 1 to 7, alternatively any seven of Examples 1 to 8. That is, any one of the hydrosilylation curable compositions of Examples 1 to 7, alternatively of Examples 1 to 8 may be excluded from some embodiments. For example, the hydrosilylation curable composition may be as formulated in any one of Examples 1 to 6, alternatively any one of Examples 2 to 7, alternatively any one of Examples 1 and 3 to 8. In other embodiments the hydrosilylation curable composition is as formulated in Example 1, alternatively Example 2, alternatively Example 3, alternatively Example 4, alternatively Example 5, alternatively Example 6, alternatively Example 7, alternatively Example 8.

In some embodiments the invention comprises the cured product of curing the hydrosilylation curable composition as formulated in any one of Examples 1 to 7, alternatively any one of Examples 1 to 8. In some embodiments the cured product is selected from a group of any six of the Examples 1 to 7, alternatively any seven of Examples 1 to 8. That is, any one of the cured products of Examples 1 to 7, alternatively any one of Examples 1 to 8 may be excluded from some embodiments. For example, the cured product may be as prepared in any one of Examples 1 to 6, alternatively any one of Examples 2 to 7, alternatively any one of Examples 1 and 3 to 8. In other embodiments the cured product may be as prepared in Example 1, alternatively Example 2, alternatively Example 3, alternatively Example 4, alternatively Example 5, alternatively Example 6, alternatively Example 7, alternatively Example 8.

The invention claimed is:

1. A hydrosilylation curable composition comprising components (a), (b), and (e) and at least one of components (c) and (d):
   (a) a resin material having the unit formula $[R^1R^2R^3SiO_{1/2}]_a[R^1R^2R^4SiO_{1/2}]_b[R^1R^5SiO_{2/2}]_c$ 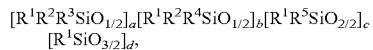

wherein $R^1$, $R^2$, and $R^3$ are independently a $C_1$ to $C_{30}$ hydrocarbyl group free of aliphatic unsaturation, and $R^4$ and $R^5$ are independently a $C_1$ to $C_{30}$ hydrocarbyl group free of aliphatic unsaturation or a $C_2$ to $C_{30}$ hydrocarbyl group comprising aliphatic unsaturation,
   $0 \leq$ subscript $a < 0.1$,
   $0 <$ subscript $b < 0.2$,
   $0 \leq$ subscript $c < 0.2$,
   subscript $d = (1-a-b-c)$, the resin material has a weight average molecular weight of about 1500 grams per mole (g/mole) to about 5000 g/mole, and
   the resin material has a mole ratio of silicon bonded hydroxy (SiOH) to resin material of about 0.05 to about 0.5;

(b) a crosslinker having the unit formula
   $[R^1R^2R^8SiO_{1/2}]_e[R^1R^9SiO_{2/2}]_f[R^1SiO_{3/2}]_g$, wherein $R^1$ and $R^2$ are independently a $C_1$ to $C_{30}$ hydrocarbyl free of aliphatic unsaturation, $R^8$ and $R^9$ are independently a H, a $C_1$ to $C_{30}$ hydrocarbyl free of aliphatic unsaturation or a silane radical of the formula $-[R^{10}R^{11}Si]_p[R^{10}R^{11}SiH]$ (wherein $R^{10}$, $R^{11}$ is independently a H or a $C_1$ to $C_{30}$ hydrocarbyl free of aliphatic unsaturation, subscript p is an integer from 0 to 10),
   subscript e is an integer from 0 to 10,
   subscript f is an integer from 0 to 10,
   subscript g is an integer from 0 to 20, and
   the number of SiH groups in the crosslinker is $\geq 2$ per crosslinker molecule; and (e) a hydrosilylation catalyst;
   and at least one of:
   (c) an SiH siloxane having the formula $[R^1R^2R^6SiO_{1/2}][R^1R^2SiO_{2/2}]_m[O_{1/2}SiR^6R^2R^1]$, 

wherein $R^1$ and $R^2$ is independently a $C_1$ to $C_{30}$ hydrocarbyl free of aliphatic unsaturation,
   $R^6$ independently is H or a silane radical of the formula $-[SiR^1R^2]_p[R^1R^2SiH]$,
   wherein subscript p is an integer from 0 to 10, and
   subscript m is an integer from 20 to 200; and (d) an organosiloxane comprising at least two silicon atom-bonded hydrocarbyl groups comprising aliphatic unsaturation having the unit formula $[R^1R^2R^7SiO_{1/2}][R^1R^2SiO_{2/2}]_n[O_{1/2}SiR^7R^1R^2]$, 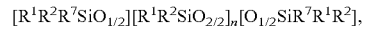

wherein $R^1$ and $R^2$ is independently a $C_1$ to $C_{30}$ hydrocarbyl free of aliphatic unsaturation,
   $R^7$ is a $C_2$ to $C_{30}$ hydrocarbyl comprising aliphatic unsaturation, and subscript n is an integer from 20 to 200.

2. The hydrosilylation curable composition of claim 1, wherein the curable composition comprises component combinations selected from the group consisting of:
   components (a), (b), (d), and (e);
   components (a), (b), (c), and (e); and
   components (a), (b), (c), (d), and (e).

3. The hydrosilylation curable composition of claim 1, wherein $R^4$ or $R^7$ is vinyl.

4. The hydrosilylation curable composition of claim 1, wherein subscript f or g is 0.

5. The hydrosilylation curable composition of claim 1, comprising a crosslinker of the formula $[R^1R^2R^8SiO_{1/2}]_e[R^1R^9SiO_{2/2}]_f$ and a crosslinker of the formula $[R^1R^2R^8SiO_{1/2}]_e[R^1SiO_{3/2}]_g$ in a ratio of about 5:1 to about 3:1 w/w, wherein $R^1$, $R^2$, $R^8$, $R^9$, subscript e, subscript f, and subscript g independently are as defined therein.

6. The curable composition of claim 1, wherein 0.05<subscript b<0.15 or 0.08<subscript b<0.15; or wherein 0≤subscript c<0.1; or wherein 0.05<subscript b<0.15 or 0.08<subscript b<0.15 and 0≤subscript c<0.1.

7. The hydrosilylation curable composition of claim 1, wherein the resin material has a weight average molecular weight of about 2400 g/mole to 3600 g/mole; or wherein the resin material has a mole ratio of silicon bonded hydroxy (SiOH) to resin material of about 0.1 to about 0.3; or wherein the resin material has a weight average molecular weight of about 2400 g/mole to 3600 g/mole and the resin material has a mole ratio of silicon bonded hydroxy (SiOH) to resin material of about 0.1 to about 0.3.

8. The hydrosilylation curable composition of claim 1, wherein subscript m is an integer from 50 to 150; or wherein subscript n is an integer from 50 to 150; or wherein m is an integer from 50 to 150 and n is an integer from 50 to 150.

9. The hydrosilylation curable composition of claim 1, wherein the curable composition further comprises a condensation catalyst; or wherein the curable composition further comprises a phosphor or a filler; or wherein the curable composition further comprises a condensation catalyst and further comprises a phosphor or a filler.

10. The hydrosilylation curable composition of claim 1, wherein the curable composition is flowable at 20 degrees Celsius (° C.) and 101.3 kilopascals (kPa); or wherein the curable composition has a cure speed in Pascals per minute (Pa/min) of from about 0.5 to about 10 Pa/min by 150° C. isothermal rheology measurements; or wherein the curable composition is flowable at 20 degrees Celsius (° C.) and 101.3 kilopascals (kPa) and the curable composition has a cure speed in Pascals per minute (Pa/min) of from about 0.5 to about 10 Pa/min by 150° C. isothermal rheology measurements.

11. A cured product of curing the hydrosilylation curable composition of claim 1.

12. The cured product of claim 11, wherein the cured product has a Young's modulus of about 20 MPa to about 300 MPa after thermal aging at 225° C. for 48 hours; or wherein the cured product has a Young's modulus before thermal aging and a Young's modulus after thermal aging at 225° C. for 48 hours, wherein the ratio of the Young's modulus of the cured product after thermal aging at 225° C. for 48 hours versus the Young's modulus of the cured product before thermal aging is less than 4.

13. The cured product of claim 11, wherein the cured product is an organosiloxane block copolymer comprising:
0 to 10 mole percent M constituent units of the formula $[R_3SiO_{1/2}]$,
40 to 90 mole percent D constituent units of the formula $[R_2SiO_{2/2}]$, and
10 to 80 mole percent T constituent units of the formula $[RSiO_{3/2}]$;
wherein:
the sum of the mole percent M, D, and T constituent units is 100 mole percent;
the cured product comprises 0.5 to 35 mole percent silicon bonded hydroxy (SiOH);
R is independently a $C_1$ to $C_{30}$ hydrocarbyl free of aliphatic unsaturation or a $C_1$ to $C_{30}$ hydrocarbyl group comprising at least one aliphatic unsaturated bond;
the D constituent units $[R_2SiO_{2/2}]$ are arranged in linear blocks having an average of from 50 to 300 D constituent units $[R_2SiO_{2/2}]$ per linear block;
the T constituent units $[RSiO_{3/2}]$ are arranged in non-linear blocks having a molecular weight of at least 500 g/mole;
the M constituent units $[R_3SiO_{1/2}]$ are connected to T units;
at least 30% of the non-linear blocks are crosslinked with each other;
each linear block is linked to at least one non-linear block via —Si—O—Si— linkages;
the organosiloxane block copolymer has a weight average molecular weight of at least 20,000 g/mole; and
the organosiloxane block copolymer comprises from about 0.5 to about 5 mole % $C_1$ to $C_{30}$ hydrocarbyl group comprising at least one aliphatic unsaturated bond.

14. The cured product of claim 13, wherein the cured product is an organosiloxane block copolymer comprising
0 to 10 mole percent M constituent units of the formula $[R_3SiO_{1/2}]$,
40 to 90 mole percent D constituent units of the formula $[R_2SiO_{2/2}]$, and
10 to 60 mole percent T constituent units of the formula $[RSiO_{3/2}]$;
wherein:
the sum of the mole percent M, D, and T constituent units is ≤100 mole percent;
the cured product comprises 0.5 to 35 mole percent silicon bonded hydroxy (SiOH);
R is independently a $C_1$ to $C_{30}$ hydrocarbyl free of aliphatic unsaturation or a $C_1$ to $C_{30}$ hydrocarbyl group comprising at least one aliphatic unsaturated bond;
the D constituent units $[R_2SiO_{2/2}]$ are arranged in linear blocks having an average of from 50 to 300 D constituent units $[R_2SiO_{2/2}]$ per linear block;
the T constituent units $[RSiO_{3/2}]$ are arranged in non-linear blocks having a molecular weight of at least 500 g/mole;
the M constituent units $[R_3SiO_{1/2}]$ are connected to T units;
at least 30% of the non-linear blocks are crosslinked with each other;
each linear block is linked to at least one non-linear block via —Si—O—Si— linkages;
the organosiloxane block copolymer has a weight average molecular weight of at least 20,000 g/mole; and
the organosiloxane block copolymer comprises from about 0.5 to about 5 mole % $C_1$ to $C_{30}$ hydrocarbyl group comprising at least one aliphatic unsaturated bond.

15. The cured product of claim 11, wherein the cured product has an elongation at break before thermal aging at 225° C. for 48 hours of about 20% to about 200%; or wherein the CIE b* value after aging for 72 hours at 225° C. is from 0 to about 7; or wherein the cured product has an elongation at break before thermal aging at 225° C. for 48 hours of about 20% to about 200% and the CIE b* value after aging for 72 hours at 225° C. is from 0 to about 7.

* * * * *